United States Patent
Gardner et al.

(10) Patent No.: US 10,968,584 B1
(45) Date of Patent: Apr. 6, 2021

(54) ACTUATOR FOR SECURITY GATES

(71) Applicant: K12 Defense Consultants, LLC, Mesa, AZ (US)

(72) Inventors: David Russell Gardner, Tucson, AZ (US); Charles Lee Brown, Jr., Mesa, AZ (US)

(73) Assignee: K12 Defense Consultants, LLC, Mesa, AZ (US)

( * ) Notice: Subject to any disclaimer, the term of this patent is extended or adjusted under 35 U.S.C. 154(b) by 0 days.

(21) Appl. No.: 16/990,891

(22) Filed: Aug. 11, 2020

Related U.S. Application Data

(63) Continuation-in-part of application No. 16/015,144, filed on Jun. 21, 2018, now Pat. No. 10,738,867.

(60) Provisional application No. 62/523,548, filed on Jun. 22, 2017.

(51) Int. Cl.

| | |
|---|---|
| *F16H 25/18* | (2006.01) |
| *E01F 13/04* | (2006.01) |
| *F16H 25/22* | (2006.01) |
| *F16D 7/00* | (2006.01) |
| *F16H 25/24* | (2006.01) |
| *F16H 25/20* | (2006.01) |

(52) U.S. Cl.
CPC ............ *E01F 13/046* (2013.01); *F16D 7/005* (2013.01); *F16H 25/2015* (2013.01); *F16H 25/2204* (2013.01); *F16H 25/24* (2013.01); *F16H 25/2454* (2013.01); *F16H 2025/2062* (2013.01); *F16H 2025/2075* (2013.01)

(58) Field of Classification Search
CPC .... F16H 25/20; F16H 25/2015; F16H 25/205; F16H 25/2056; F16H 25/2204; F16H 25/2214; F16H 25/24; F16H 25/2454; F16H 2025/2031; F16H 2025/204; F16H 2025/2053; F16H 2025/2062; F16H 2025/2075; F16H 2025/2081; E01F 13/046; F16D 7/005
See application file for complete search history.

(56) References Cited

U.S. PATENT DOCUMENTS

| | | | | |
|---|---|---|---|---|
| 4,715,742 | A * | 12/1987 | Dickinson | ............. E01F 13/046 404/6 |
| 8,794,865 | B2 * | 8/2014 | Stadler | .................. E01F 13/046 404/6 |
| 10,502,294 | B2 * | 12/2019 | Piermarini | .............. B26F 3/004 |

* cited by examiner

*Primary Examiner* — Adam D Rogers
(74) *Attorney, Agent, or Firm* — Booth Udall Fuller, PLC

(57) ABSTRACT

A security gate actuator includes a main ball screw, a main ball nut, and a drive shaft stage. The main ball screw may further include a circular channel disposed on an outer surface of the main ball screw and at least one drive ball disposed in the circular channel. The main ball nut may be disposed on the main threads of the main ball screw and configured to translate rotational motion of the main ball screw to linear motion of the main ball nut. The drive shaft stage may include a drive shaft end and a drive shaft tube attached to the drive shaft end, the drive shaft end coupled to the main ball nut. The drive ball may push against the drive shaft tube to translate the rotational motion of the main ball screw to rotational motion of the drive shaft tube.

20 Claims, 27 Drawing Sheets

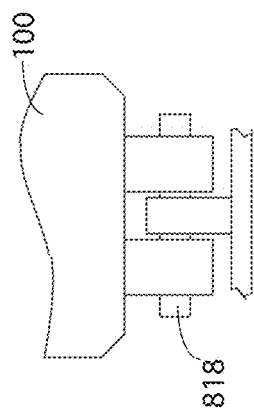
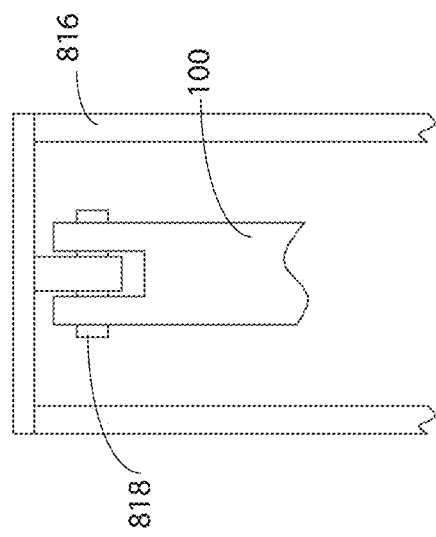

ACTUATOR FOR SECURITY GATES

RELATED APPLICATIONS

This application is a continuation-in-part of U.S. patent application Ser. No. 16/015,144, filed Jun. 21, 2018, titled "ACTUATOR FOR SECURITY GATES," which issued as U.S. Pat. No. 10,738,867 on Aug. 11, 2020, and which application claims the benefit of U.S. provisional patent application No. 62/523,548, filed Jun. 22, 2017 titled "Sealed Actuating Unit for Security Gates," the entirety of the disclosure of which is incorporated by this reference.

TECHNICAL FIELD

Aspects of this document relate generally to security gate actuators, especially security gate actuators that are electrically operated.

BACKGROUND

Some high-end security gate systems, such as those used in front of government buildings, financial buildings, and research facilities, involve a large steel or steel and concrete bollard that rises out of and retracts into the ground to block vehicle passage when the bollards are raised and allow vehicle passage through an opening in the security gate when the bollards are lowered into the ground. Examples of a set of bollards are illustrated in FIGS. 1A and 1B. The size and strength of the bollards used depends upon the particular level of security needed for the area being protected, but generally the bollards are large and strong enough to withstand being hit by an automobile, and some can withstand being hit at high speeds by an armored truck. Approximately 90-95% of actuating systems for raising and lowering the bollards work hydraulically, with a hydraulic actuating unit extending and retracting the bollards, and approximately 5% work pneumatically. Each has its benefits and problems.

SUMMARY

According to an aspect of the disclosure, a security gate actuator may comprise a motor configured to electrically couple to a power source, a main stage comprising a main ball screw and a main ball nut, the main ball screw having a first end operatively coupled to the motor and a second end opposite the first end and distal to the motor, the main ball screw having a central axis and comprising main threads disposed on an outer surface of the main ball screw, the main ball nut disposed around and mateably coupled to the main threads, the main ball nut configured to translate rotational motion of the main ball screw to linear motion of the main ball nut; a drive shaft stage sharing the central axis and comprising a drive shaft end and a drive shaft tube, the drive shaft tube comprising a first end proximate the motor and a second end opposite the first end and distal to the motor, the drive shaft end coupled to the main ball nut and coupled to the drive shaft tube at the first end of the drive shaft tube, the drive shaft tube coupled to the main ball screw through a slip joint configured to translate the rotational motion of the main ball screw to rotational motion of the drive shaft tube, a second stage comprising a second ball screw and a second ball nut, the second ball screw sharing the central axis and comprising second threads disposed on an outer surface of the second ball screw, the second ball nut disposed around and mateably coupled to the second threads, the second ball nut attached to the drive shaft tube at the second end of the drive shaft tube and configured to translate the rotational motion of the drive shaft tube to linear motion of the second ball screw, the second ball screw configured to couple to a bollard of a security gate, a fail-safe lock disposed adjacent the first end of the main ball screw, the fail-safe lock comprising an engaged position in which the fail-safe lock engages the main ball screw and restricts the main ball screw from rotating, and a disengaged position in which the fail-safe lock disengages from the main ball screw and permits the main ball screw to rotate; a housing enclosing the motor, the main stage, the drive shaft stage, the second stage, and the fail-safe lock, and an air manifold coupled to the housing and configured to receive air into the housing and maintain positive air pressure inside the housing relative to outside of the housing.

Particular embodiments may comprise one or more of the following features. The main ball screw may further comprise a screw body having an outer diameter and a circular channel disposed on the outer surface of the main ball screw at the second end of the main ball screw, the drive shaft end may further comprise a core having an inner diameter, the drive shaft tube further comprising a square cuboid having a square base, a side of the square base being greater than the outer diameter of the main ball screw but smaller than the inner diameter of the drive shaft end, the drive shaft tube disposed around and outside the second end of the main ball screw, the drive shaft end disposed around and outside the first end of the drive shaft tube, and the slip joint may further comprise at least three drive balls, each of the at least three drive balls disposed in the circular channel of the main ball screw adjacent a vertex of the square base of the drive shaft tube and positioned in contact with two joining faces of the drive shaft tube, wherein each of the at least three drive balls pushes against at least one of the joining faces of the drive shaft tube and translates the rotational motion of the main ball screw to the rotational motion of the drive shaft tube when the main ball screw rotates. The housing may comprise a main stage housing, a drive shaft stage housing, and a second stage housing, the security gate actuator further comprising a first seal between the main stage housing and an outer surface of the drive shaft stage housing, and a second seal between the drive shaft stage housing and an outer surface of the second stage housing. The security gate actuator may comprise a fully-retracted position and a fully-extended position, wherein in the fully-retracted position a majority of the main ball screw is disposed inside the drive shaft tube and a majority of the second ball screw is disposed inside the drive shaft tube, and in the fully-extended position the first end of the drive shaft tube is disposed adjacent the second end of the main ball screw and a first end of the second ball screw is disposed adjacent the second end of the drive shaft tube. The fail-safe lock may further comprise a lock end disposed at the first end of the main ball screw, a lock star disposed adjacent the motor opposite the lock end, wherein the lock end is positioned to engage the lock star when the fail-safe lock is in the engaged position, the fail-safe lock further comprising a piston positioned between the lock star and the main stage and configured to pneumatically disengage the lock end from the lock star to place the fail-safe lock in the disengaged position. The main ball screw may further comprise a tunnel inside the main ball screw, the tunnel extending from the second end of the main ball screw into a screw body of the main ball screw, and a portion of the second ball screw disposed in the tunnel when the security gate actuator is in a fully-retracted position. The security gate actuator may further comprise a position sensor located inside the housing and a magnet disposed adjacent the drive shaft stage, wherein the position sensor is magnetically triggered by the magnet as the security gate actuator moves from a fully-retracted position to a fully-extended position. The security gate actuator may comprise a power-assist spring surrounding the main stage, the drive shaft stage, and the second stage, the power-assist spring comprising a first end proximate the motor and a second end proximate a second end of the second ball screw.

According to an aspect, a security gate actuator may comprise a motor configured to electrically couple to a power source; a main stage comprising a main ball screw and a main ball nut, the main ball screw having a first end operatively coupled to the motor and a second end opposite the first end and distal to the motor, the main ball screw having a central axis and comprising main threads disposed on an outer surface of the main ball screw, the main ball nut disposed around and mateably coupled to the main threads, the main ball nut configured to translate rotational motion of the main ball screw to linear motion of the main ball nut, a drive shaft stage sharing the central axis and comprising a drive shaft end and a drive shaft tube, the drive shaft tube comprising a first end proximate the motor and a second end opposite the first end and distal to the motor, the drive shaft end coupled to the main ball nut and coupled to the drive shaft tube at the first end of the drive shaft tube, the drive shaft tube coupled to the main ball screw through a slip joint configured to translate the rotational motion of the main ball screw to rotational motion of the drive shaft tube, a second stage comprising a second ball screw and a second ball nut, the second ball screw sharing the central axis and comprising second threads disposed on an outer surface of the second ball screw, the second ball nut disposed around and mateably coupled to the second threads, the second ball nut attached to the drive shaft tube at the second end of the drive shaft tube and configured to translate the rotational motion of the drive shaft tube to linear motion of the second ball screw, the second ball screw configured to couple to a bollard of a security gate, and a housing enclosing the motor, the main stage, the drive shaft stage, and the second stage.

Particular embodiments may comprise one or more of the following features. The main ball screw may further comprise a screw body having an outer diameter and a circular channel disposed on the outer surface of the main ball screw at the second end of the main ball screw; the drive shaft end may further comprise a core having an inner diameter, the drive shaft tube further comprising a square cuboid having a square base, a side of the square base being greater than the outer diameter of the main ball screw but smaller than the inner diameter of the drive shaft end, the drive shaft tube disposed around and outside the second end of the main ball screw, the drive shaft end disposed around and outside the first end of the drive shaft tube, and the slip joint further may comprise at least two drive balls, each of the at least two drive balls disposed in the circular channel of the main ball screw adjacent a vertex of the square base of the drive shaft tube and positioned in contact with two joining faces of the drive shaft tube, and wherein each of the at least two drive balls pushes against at least one of the joining faces of the drive shaft tube and translates the rotational motion of the main ball screw to the rotational motion of the drive shaft tube when the main ball screw rotates. The housing may comprise a main stage housing, a drive shaft stage housing, and a second stage housing, the security gate actuator further comprising a first seal between the main stage housing and an outer surface of the drive shaft stage housing, and a second seal between the drive shaft stage housing and an outer surface of the second stage housing. The security gate actuator may comprise a fully-retracted position and a fully-extended position, wherein in the fully-retracted position a majority of the main ball screw is disposed inside the drive shaft tube and a majority of the second ball screw is disposed inside the drive shaft tube, and in the fully-extended position the first end of the drive shaft tube is disposed adjacent the second end of the main ball screw and a first end of the second ball screw is disposed adjacent the second end of the drive shaft tube. The security gate actuator may further comprise a fail-safe lock disposed adjacent the first end of the main ball screw, the fail-safe lock comprising an engaged position in which the fail-safe lock engages the main ball screw and restricts the main ball screw from rotating, and a disengaged position in which the fail-safe lock disengages from the main ball screw and permits the main ball screw to rotate; and wherein the fail-safe lock further comprises a lock end disposed at the first end of the main ball screw, a lock star disposed adjacent the motor opposite the lock end, wherein the lock end is positioned to engage the lock star when the fail-safe lock is in the engaged position, the fail-safe lock further comprising a piston positioned between the lock star and the main stage and configured to pneumatically disengage the lock end from the lock star to place the fail-safe lock in the disengaged position. The main ball screw may further comprise a tunnel extending from the second end of the main ball screw into inside of a screw body of the main ball screw, and a portion of the second ball screw disposed in the tunnel when the security gate actuator is in a fully-retracted position. The security gate actuator may further comprise a position sensor located inside the housing and a magnet disposed adjacent the drive shaft stage, wherein the position sensor is magnetically triggered by the magnet as the security gate actuator moves from a fully-retracted position to a fully-extended position. The security gate actuator may further comprise a first position sensor disposed adjacent the first end of the main ball screw, a second position sensor disposed adjacent the second end of the main ball screw, and a third position sensor disposed between the first end and the second end of the main ball screw, wherein each of the first, second, and third position sensors is triggered as the security gate actuator moves from a fully-retracted position to a fully-extended position. The security gate actuator may further comprise a power-assist spring surrounding the main stage, the drive shaft stage, and the second stage, the power-assist spring comprising a first end proximate the motor and a second end proximate a second end of the second ball screw. The power source may comprise a battery backup configured to electrically couple to the motor.

According to an aspect, a security gate actuator may comprise a main ball screw comprising a screw body and main threads disposed on an outer surface of the screw body, the main ball screw having a first end and a second end opposite the first end, the main ball screw further comprising a circular channel disposed on an outer surface of the main ball screw at the second end of the main ball screw, a main ball nut disposed on and mateably coupled to the main threads of the main ball screw, the main ball nut configured to translate rotational motion of the main ball screw to linear motion of the main ball nut, a drive shaft stage comprising a drive shaft end having a core and a drive shaft tube attached to the drive shaft end at a first end of the drive shaft tube, the drive shaft end coupled to the main ball nut, the drive shaft tube comprising a square cuboid having a square base, a side of the square base being greater than an outer diameter of the main ball screw but smaller than an inner diameter of the drive shaft end, the drive shaft tube disposed around and outside the second end of the main ball screw, the drive shaft end disposed around and outside the first end of the drive shaft tube, and at least a drive ball disposed in the circular channel of the main ball screw adjacent a vertex of the square base of the drive shaft tube and positioned in contact with two joining faces of the square cuboid of the drive shaft tube, wherein the second end of the main ball screw is disposed inside the drive shaft tube, the first end of the drive shaft tube disposed inside the drive shaft end, each of the at least a drive ball pushes against at least one of the two joining faces of the square cuboid of the drive shaft tube to translate the rotational motion of the main ball screw to rotational motion of the drive shaft tube when the main ball screw rotates.

Particular embodiments may comprise one or more of the following features. The security gate actuator may further comprise four drive balls, each of the four drive balls disposed in the circular channel and being in contact with the two joining faces of the square cuboid of the drive shaft tube.

According to an aspect, a security gate actuator may comprise a motor mounted on a base and configured to electrically couple to a power source, a main stage comprising a main ball screw and a main ball nut, the main ball screw having a first end proximate the base and operatively coupled to the motor and a second end opposite the first end, the main ball screw further having a central axis and comprising main threads disposed on an outer surface of the main ball screw, the main ball nut disposed around and mateably coupled to the main threads, the main ball nut configured to translate rotational motion of the main ball screw to linear motion of the main ball nut, a drive shaft stage sharing the central axis and comprising a drive shaft end and a drive shaft tube, the drive shaft tube comprising a first end proximate the base and a second end opposite the first end and distal to the base, the drive shaft end coupled to the main ball nut and coupled to the drive shaft tube at the first end of the drive shaft tube, the drive shaft tube coupled to the main ball screw through a slip joint configured to translate the rotational motion of the main ball screw to rotational motion of the drive shaft tube, a second stage comprising a second ball screw and a second ball nut, the second ball screw sharing the central axis and comprising second threads disposed on an outer surface of the second ball screw, the second ball nut disposed around and mateably coupled to the second threads, the second ball nut attached to the drive shaft tube at the second end of the drive shaft tube and configured to translate the rotational motion of the drive shaft tube to linear motion of the second ball screw, the second ball screw configured to couple to a wedge plate barrier of a security gate, a fail-safe lock disposed adjacent the motor, the fail-safe lock configured to restrict the main ball screw from rotating when power is not supplied to the motor; a manual lock override system disposed within the base and coupled to the fail-safe lock, wherein the manual lock override system comprises a lock shaft extending from the base and a worm gear operatively engaged with the lock shaft, the manual lock override system configured to allow a user to override the fail-safe lock and provide rotational motion to the main ball screw when power is not supplied to the motor, and an air manifold coupled to the base and configured to receive air into the security gate actuator and maintain positive air pressure inside the security gate actuator relative to outside of the security gate actuator.

Particular embodiments may comprise one or more of the following features. The main ball screw may further comprise a screw body having an outer diameter and a circular channel disposed on the outer surface of the main ball screw at the second end of the main ball screw, the drive shaft end may further comprise a core having an inner diameter, the drive shaft tube further comprising a square cuboid having a square base, a side of the square base being greater than the outer diameter of the main ball screw but smaller than the inner diameter of the drive shaft end, the drive shaft tube disposed around and outside the second end of the main ball screw, the drive shaft end disposed around and outside the first end of the drive shaft tube, and the slip joint may further comprise at least three drive balls, each of the at least three drive balls disposed in the circular channel of the main ball screw adjacent a vertex of the square base of the drive shaft tube and positioned in contact with two joining faces of the drive shaft tube, wherein each of the at least three drive balls pushes against at least one of the joining faces of the drive shaft tube and translates the rotational motion of the main ball screw to the rotational motion of the drive shaft tube when the main ball screw rotates. The security gate actuator may comprise a fully-retracted position and a fully-extended position, wherein in the fully-retracted position a majority of the main ball screw is disposed inside the drive shaft tube and a majority of the second ball screw is disposed inside the drive shaft tube, and in the fully-extended position the first end of the drive shaft tube is disposed adjacent the second end of the main ball screw and a first end of the second ball screw is disposed adjacent the second end of the drive shaft tube. The main ball screw may further comprise a tunnel inside the main ball screw, the tunnel extending from the second end of the main ball screw into a screw body of the main ball screw, and a portion of the second ball screw may be disposed in the tunnel when the security gate actuator is in a fully-retracted position. The security gate actuator may further comprise a position sensor located inside the security gate actuator and a magnet disposed adjacent the drive shaft stage, wherein the position sensor is magnetically triggered by the magnet as the security gate actuator moves from a fully-retracted position to a fully-extended position. The security gate actuator may further comprise a power-assist spring surrounding the main stage, the drive shaft stage, and the second stage, the power-assist spring comprising a first end proximate the base and a second end proximate a second end of the second ball screw.

According to an aspect, a security gate actuator may comprise a motor mounted on a base and configured to electrically couple to a power source, a main stage comprising a main ball screw and a main ball nut, the main ball screw having a first end proximate the base and operatively coupled to the motor and a second end opposite the first end, the main ball screw further having an outer surface and a central axis, the main ball nut disposed around and mateably coupled to the outer surface of the main ball screw, the main ball nut configured to translate rotational motion of the main ball screw to linear motion of the main ball nut, a drive shaft stage sharing the central axis and comprising a drive shaft end and a drive shaft tube, the drive shaft tube comprising a first end proximate the base and a second end opposite the first end and distal to the base, the drive shaft end coupled to the main ball nut and coupled to the drive shaft tube at the first end of the drive shaft tube, the drive shaft tube coupled to the main ball screw through a slip joint configured to translate the rotational motion of the main ball screw to rotational motion of the drive shaft tube, and a second stage comprising a second ball screw and a second ball nut, the second ball screw sharing the central axis and comprising an outer surface, the second ball nut disposed around and mateably coupled to the outer surface of the second ball screw, the second ball nut attached to the drive shaft tube at the second end of the drive shaft tube and configured to translate the rotational motion of the drive shaft tube to linear motion of the second ball screw, the second ball screw configured to couple to a wedge plate barrier of a security gate.

Particular embodiments may comprise one or more of the following features. The security gate actuator may further comprise a fail-safe lock disposed adjacent the motor, the fail-safe lock configured to restrict the main ball screw from rotating when power is not supplied to the motor. The security gate actuator may further comprise a manual lock override system disposed within the base and coupled to the fail-safe lock, wherein the manual lock override system comprises a lock shaft extending from the base and a worm gear operatively engaged with the lock shaft, the manual lock override system configured to allow a user to override the fail-safe lock and provide rotational motion to the main ball screw when power is not supplied to the motor. The main ball screw may further comprise a screw body having an outer diameter and a circular channel disposed on the outer surface of the main ball screw at the second end of the main ball screw, the drive shaft end may further comprise a core having an inner diameter, the drive shaft tube further comprising a square cuboid having a square base, a side of the square base being greater than the outer diameter of the main ball screw but smaller than the inner diameter of the drive shaft end, the drive shaft tube disposed around and outside the second end of the main ball screw, the drive shaft end disposed around and outside the first end of the drive shaft tube, and the slip joint may further comprise at least two drive balls, each of the at least two drive balls disposed in the circular channel of the main ball screw adjacent a vertex of the square base of the drive shaft tube and positioned in contact with two joining faces of the drive shaft tube, wherein each of the at least two drive balls pushes against at least one of the joining faces of the drive shaft tube and translates the rotational motion of the main ball screw to the rotational motion of the drive shaft tube when the main ball screw rotates. The security gate actuator may comprise a fully-retracted position and a fully-extended position, wherein in the fully-retracted position a majority of the main ball screw is disposed inside the drive shaft tube and a majority of the second ball screw is disposed inside the drive shaft tube, and in the fully-extended position the first end of the drive shaft tube is disposed adjacent the second end of the main ball screw and a first end of the second ball screw is disposed adjacent the second end of the drive shaft tube. The main ball screw may further comprise a tunnel extending from the second end of the main ball screw into inside of a screw body of the main ball screw, and a portion of the second ball screw is disposed in the tunnel when the security gate actuator is in a fully-retracted position. The security gate actuator may further comprise a position sensor located inside the security gate actuator and a magnet disposed adjacent the drive shaft stage, wherein the position sensor is magnetically triggered by the magnet as the security gate actuator moves from a fully-retracted position to a fully-extended position. The security gate actuator may further comprise a first position sensor disposed adjacent the first end of the main ball screw, a second position sensor disposed adjacent the second end of the main ball screw, and a third position sensor disposed between the first end and the second end of the main ball screw, wherein each of the first, second, and third position sensors is triggered as the security gate actuator moves from a fully-retracted position to a fully-extended position.

According to an aspect, a security gate actuator may comprise a motor mounted on a base and configured to electrically couple to a power source, a main stage comprising a main ball screw and a main ball nut, the main ball screw having a first end proximate the base and operatively coupled to the motor, a second end opposite the first end, and a central axis, the main ball nut configured to translate rotational motion of the main ball screw to linear motion of the main ball nut, a drive shaft stage sharing the central axis and comprising a drive shaft end and a drive shaft tube, the drive shaft tube comprising a first end proximate the base and a second end opposite the first end and distal to the base, the drive shaft end coupled to the main ball nut and coupled to the drive shaft tube at the first end of the drive shaft tube, the drive shaft tube coupled to the main ball screw through a slip joint configured to translate the rotational motion of the main ball screw to rotational motion of the drive shaft tube, and a second stage comprising a second ball screw and a second ball nut, the second ball screw sharing the central axis, the second ball nut attached to the drive shaft tube at the second end of the drive shaft tube and configured to translate the rotational motion of the drive shaft tube to linear motion of the second ball screw.

Particular embodiments may comprise one or more of the following features. The security gate actuator may further comprise a fail-safe lock disposed adjacent the motor, the fail-safe lock configured to restrict the main ball screw from rotating when power is not supplied to the motor, and a manual lock override system disposed within the base and coupled to the fail-safe lock, wherein the manual lock override system comprises a lock shaft extending from the base and a worm gear operatively engaged with the lock shaft, the manual lock override system configured to allow a user to override the fail-safe lock and provide rotational motion to the main ball screw when power is not supplied to the motor. The main ball screw may further comprise a screw body having an outer diameter and a circular channel disposed on the outer surface of the main ball screw at the second end of the main ball screw, the drive shaft end may further comprise a core having an inner diameter, the drive shaft tube further comprising a square cuboid having a square base, a side of the square base being greater than the outer diameter of the main ball screw but smaller than the inner diameter of the drive shaft end, the drive shaft tube disposed around and outside the second end of the main ball screw, the drive shaft end disposed around and outside the first end of the drive shaft tube, the slip joint may further comprise at least one drive ball, each of the at least one drive ball disposed in the circular channel of the main ball screw adjacent a vertex of the square base of the drive shaft tube and positioned in contact with two joining faces of the drive shaft tube, wherein each of the at least one drive ball pushes against at least one of the joining faces of the drive shaft tube and translates the rotational motion of the main ball screw to the rotational motion of the drive shaft tube when the main ball screw rotates. The security gate actuator may comprise a fully-retracted position and a fully-extended position, wherein in the fully-retracted position a majority of the main ball screw is disposed inside the drive shaft tube and a majority of the second ball screw is disposed inside the drive shaft tube, and in the fully-extended position the first end of the drive shaft tube is disposed adjacent the second end of the main ball screw and a first end of the second ball screw is disposed adjacent the second end of the drive shaft tube. The main ball screw may further comprise a tunnel extending from the second end of the main ball screw into inside of a screw body of the main ball screw, and a portion of the second ball screw is disposed in the tunnel when the security gate actuator is in a fully-retracted position. The security gate actuator may further comprise a position sensor located inside the security gate actuator and a magnet disposed adjacent the drive shaft stage, wherein the position sensor is magnetically triggered by the magnet as the security gate actuator moves from a fully-retracted position to a fully-extended position.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material, or acts in support of the function. Thus, even when the claims recite a "means for performing the function of . . . " or "step for performing the function of . . . ," if the claims also recite any structure, material, or acts in support of that means or step, or to perform the recited function, it is the clear intention of the inventors not to invoke the provisions of 35 U.S.C. § 112112(f). Moreover, even if the provisions of 35 U.S.C. § 112(f), are invoked to define the claimed aspects, it is intended that these aspects not be limited only to the specific structure, material, or acts that are described in the preferred embodiments, but in addition, include any and all structures, material, or acts that perform the claimed function as described in alternative embodiments or forms in the disclosure, or that are well-known present or later-developed, equivalent structures, material, or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 3C illustrates the attachment between the security gate actuator and the bollard illustrated in FIG. 3A;

FIG. 3D illustrates the attachment between the security gate actuator and its attachment point to the ground;

DETAILED DESCRIPTION

Figure 1A:
FIG. 1A illustrates bollards actuated by a prior art security gate actuator.

This disclosure, its aspects and implementations, are not limited to the specific material types, system component examples, or methods disclosed herein. Many additional components, manufacturing and assembly procedures known in the art consistent with product design and manufacture are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes embodiments in many different forms, they are illustrated in the drawings and will herein be described in detailed particular embodiments with the understanding that the present disclosure is to be considered as an exemplification of the principles of the disclosed methods and systems, and is not intended to limit the broad aspect of the disclosed concepts to the embodiments illustrated.

Figure 1B:
FIG. 1B illustrates bollards used to block incoming vehicles.

As illustrated in FIGS. 1A and 1B, bollards 1816, 2816 in high-end security system may be used to withstand hits from vehicles or even armored trucks. For a conventional hydraulic actuating unit, if relying only upon a pump, it takes as many as five minutes to raise the bollards. To compensate for this delay and reestablish the security gate more quickly, accumulators are typically added to store added pressure for a fast rise. A ⅜" hydraulic fluid line is typically used to provide the pressure and the system typically stores 1500-2000 lbs. of hydraulic pressure. The system is under a constant pressure to maintain the ability for a quick rise, and when a command is received to lower and raise the bollards, the parts rub violently on the inside of the housing. There is no way in a hydraulic system to predict when the system will break down, but when it does break down, the system loses all of its oil pressure. The oil ends up in the ground, leeching and seeping into the surrounding area. The system is unusable and the bollards remain in their last position, either up, down, or somewhere in the middle, until the system is repaired.

A conventional pneumatic actuating unit requires that an incredibly large volume of air be stored in a tank under very high pressure. Because changing pressures introduce condensation, parts regularly rust, become weakened, and fail without notice. Both hydraulic and pneumatic actuating units also suffer from seasonal variations in raising and lowering speed. The environmental temperature changes cause the hydraulic and pneumatic fluids to be more or less dense at different times of the year, leading to different raising and lowering speeds.

The present disclosure concerns a security gate actuator that replaces the unpredictable failures and difficult repairs of existing hydraulic and pneumatic systems with a retrofit electrical/mechanical security gate actuator. Such a security gate actuator is capable of raising and lowering the bollards quickly and does not have the issues raised by the environmentally hazardous hydraulic oil or the rust-inducing pneumatic condensation of conventional systems. The security gate actuator embodiments and features disclosed herein may be operated entirely with electricity and backup batteries, and if there is a failure, the previous unit can be easily replace by a replacement unit without clean-up, patching of holes, or inspection of all of the supply tubes and components as is required by failed pneumatic and hydraulic systems.

Figure 2:
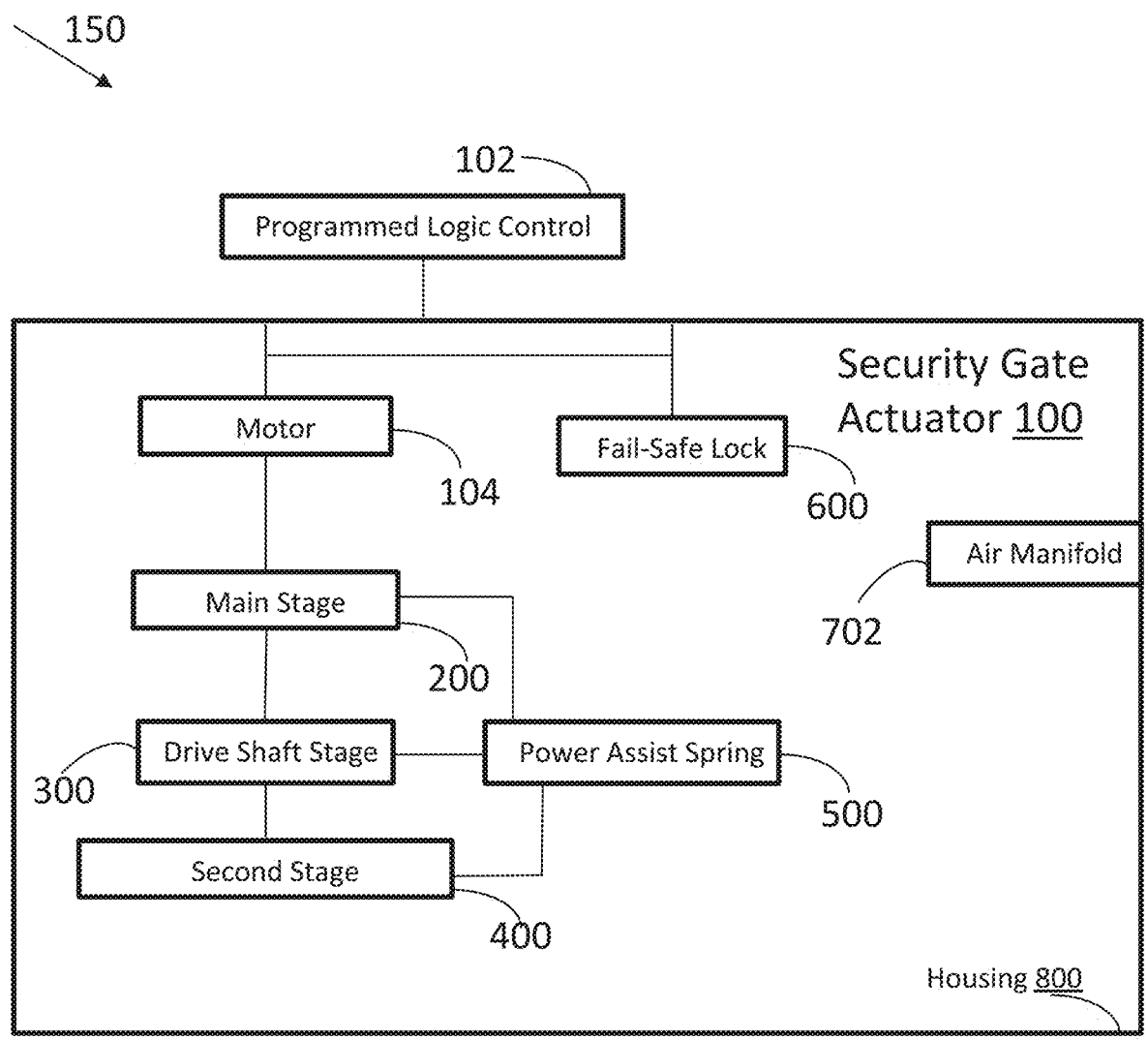
FIG. 2 is a schematic diagram of an example actuator system.

An actuator system 150 comprises a security gate actuator 100 and a programmed logic control 102. FIG. 2 illustrates a schematic diagram of a non-limiting example of an actuator system. The programmed logic control 102 is the control center of the actuator system 150.

Figure 3A:
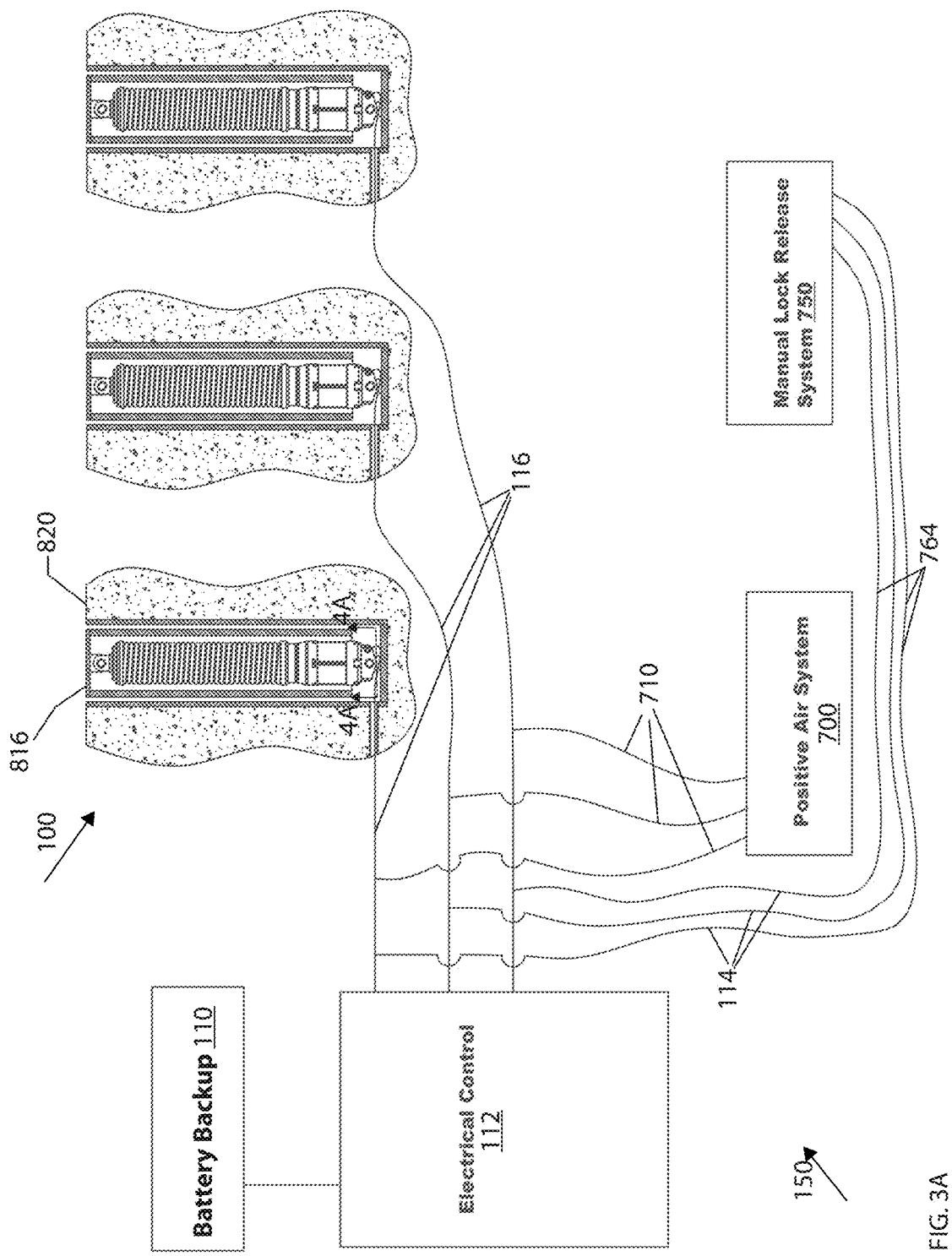
FIG. 3A illustrates an example actuator system when the security gate actuators are in fully-retracted positions.
Figure 3B:
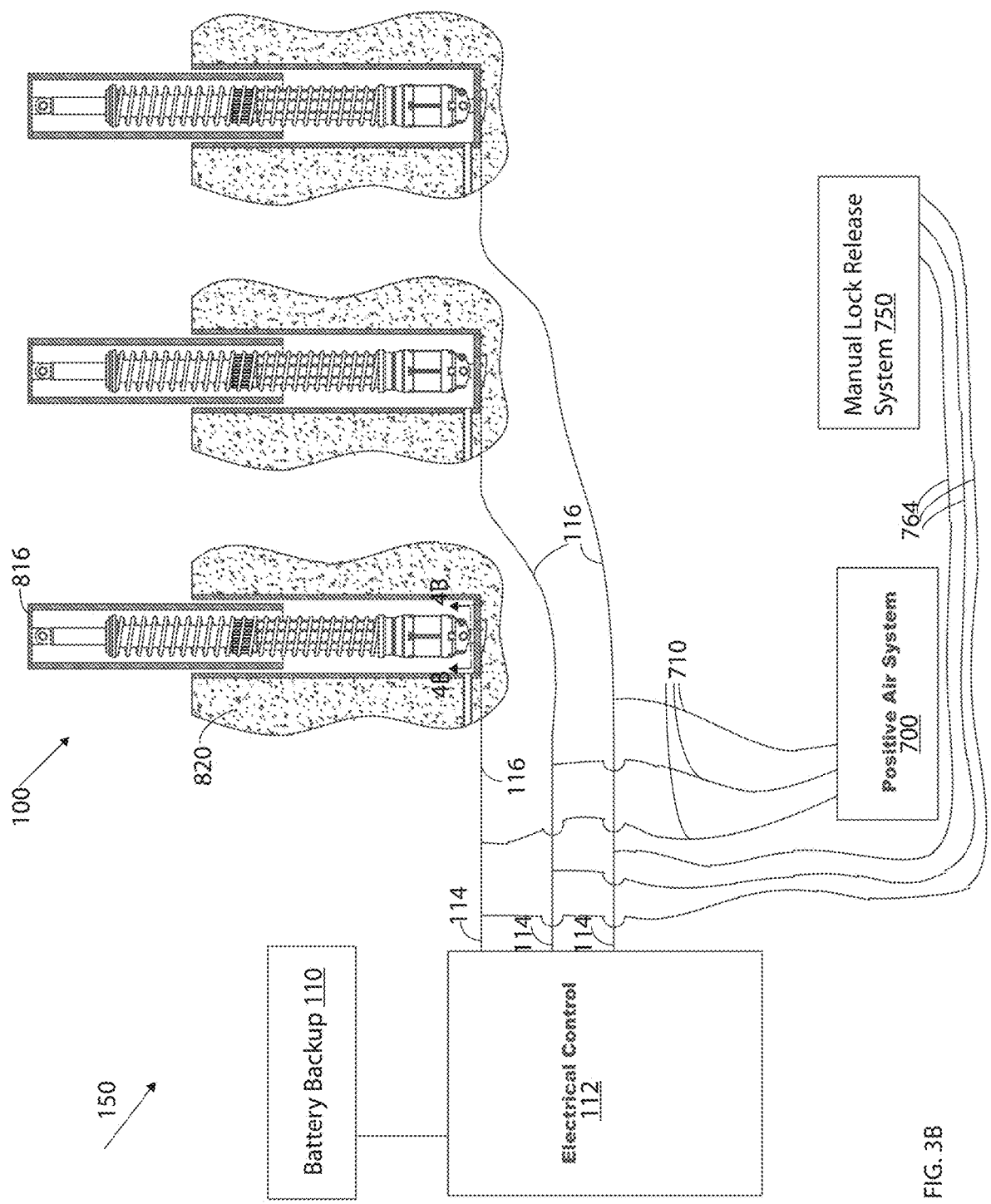
FIG. 3B illustrates the actuator system illustrated in FIG. 3A when the security gate actuators are in fully-extended positions.

FIGS. 3A and 3B illustrate an example actuator system 150. FIG. 3A illustrates the actuator system 150 when the security gate actuator 100 is in a fully-retracted position, where the bollards 816 are retracted into the ground and the security gate is open. The bollards 816 are inside the bollard casing 820 when the security gate actuators 100 are in fully retracted positions. The bollard casing 820 may be set in reinforced concrete. FIG. 3B illustrates the actuator system 150 when the security gate actuator 100 is in a fully extended position, where at least a majority of each of the bollards 816 is above the ground and the security gate is closed. FIG. 3C illustrates the bollard 816 attached to the security gate actuator 100 through a pin 818. FIG. 3D illustrates the security gate actuator 100 attached to its attachment point on the ground through another pin 818. The pin 818 may be a hardened pin. In some embodiments, the security gate actuators may be controlled as one unit. In some embodiments, the security gate actuators may be individually controlled such that, if one security gate actuator fails, other security gate actuators still function and move their respective bollards.

In particular embodiments, an actuator system 150 comprises one or more security gate actuators 100, an electrical control 112, a positive air system 700, and a manual lock release system 750 (FIGS. 3A-3B). The actuator system 150 may further comprise a battery backup 110. The electrical cables 114 from the electrical control 112, the air lines 710 from the positive air system 700, and the air lines 764 from the manual lock release system 750 may be combined into tubing hoses 116 and fed into the security gate actuator 100. Particular embodiments of the tubing hose may have a diameter of 1.905 cm (0.75 inches).

Figure 4A:
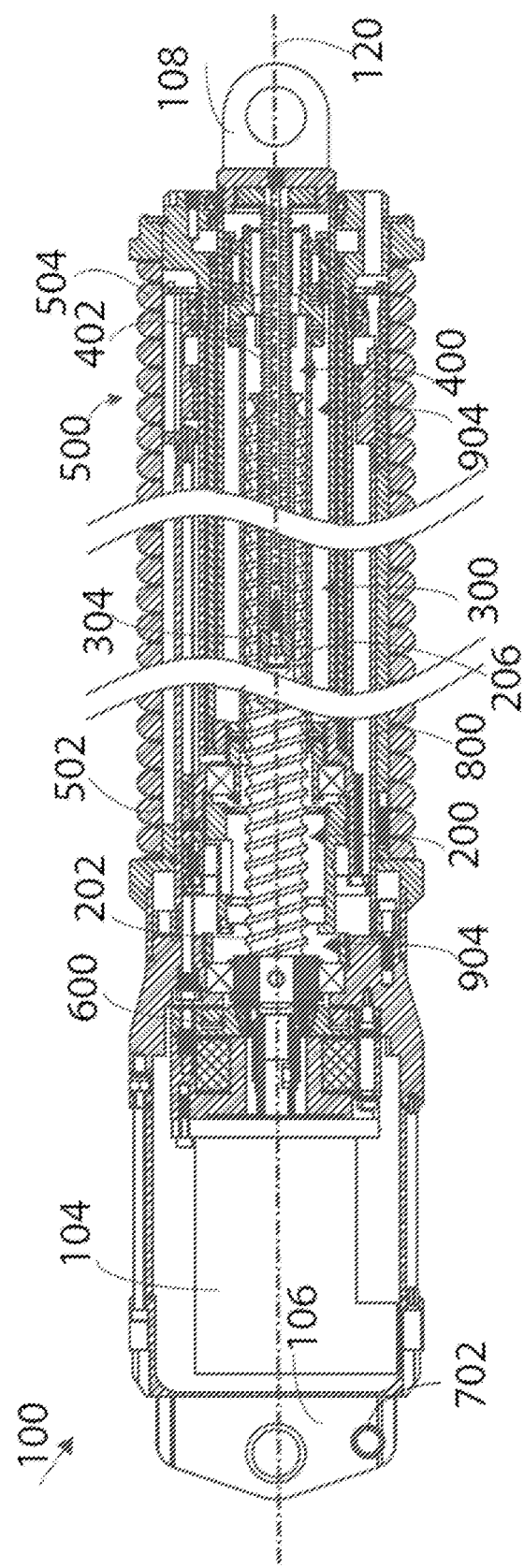
FIG. 4A is a cross-sectional view of the security gate actuator illustrated in FIG. 3A along the cross-sectional line 4A-4A when the security gate actuator is fully retracted.
Figure 4B:
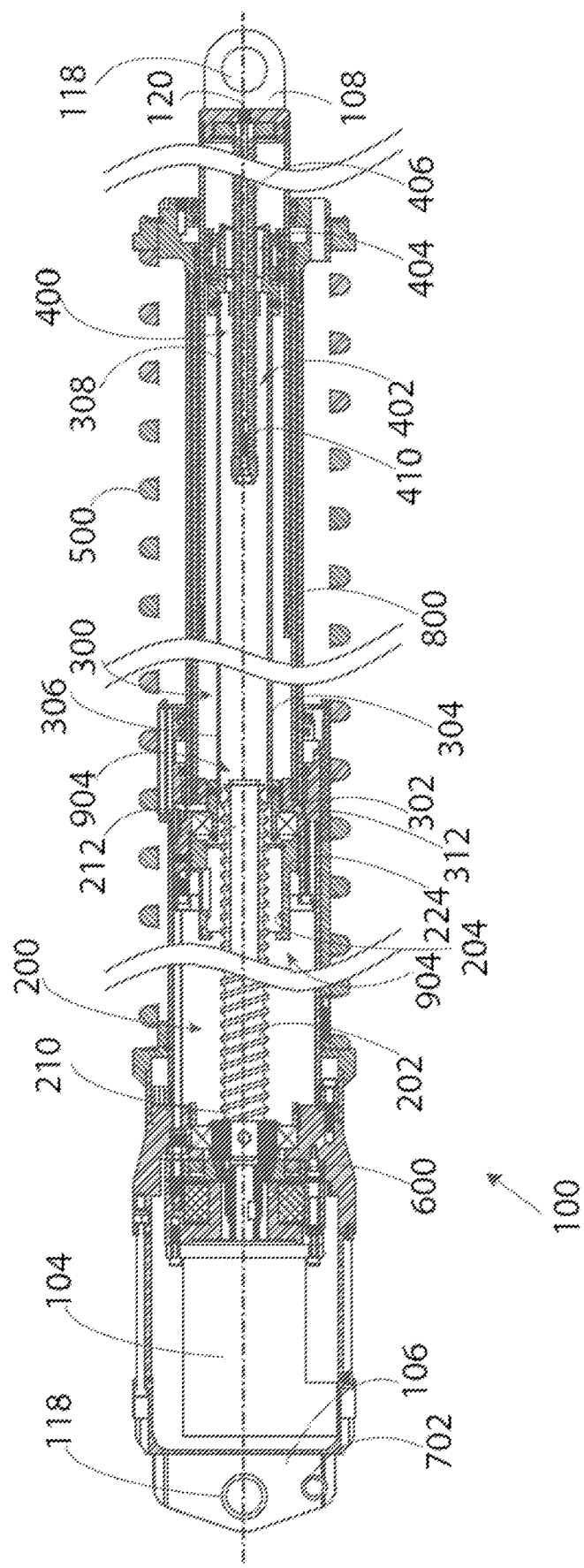
FIG. 4B is a cross-sectional view of the security gate actuator illustrated in FIG. 3B along the cross-sectional line 4B-4B when the security gate actuator is fully extended.

A security gate actuator 100 is used to retract or extend a bollard 816 of a security gate to open or close the security gate. A security gate actuator 100 comprises a main stage 200 and a drive shaft stage 300 (FIGS. 4A-4B). A security gate actuator 100 may further comprise a second stage 400. A security gate actuator 100 may further comprise a motor or a drive motor 104. The motor 104 may be a brushless drive motor. The motor 104 is configured to electrically couple to a power source. The power source may produce alternating current (AC) power or direct current (DC) power. A security gate actuator 100 may further comprise a housing 800 that encloses other components of the security gate actuator 100. A security gate actuator 100 may further comprise a fail-safe lock 600 and an air manifold 702. In particular embodiments, including the embodiments disclosed herein, a security gate actuator 100 may comprise eight main components: a brushless drive motor 104, a fail-safe lock 600, a main stage 200, a drive shaft stage 300, a second stage 400, a power-assist spring 500, a housing 800, and an air manifold 702.

FIGS. 4A and 4B illustrate the security gate actuator 100 in a fully-retracted position (FIG. 4A) and in a fully-extended position (FIG. 4B). The security gate actuator 100 is configured to attach to the ground at the first end 106 and attach to a bollard at the second end 108 opposite the first end 106. Beginning at the first end 106 of the security gate actuator 100, the motor 104, the main stage 200, the drive shaft stage 300, and the second stage 400 may positioned next to each other. The main stage 200 comprises a main ball screw 202 comprising a first end 210 and a second end 212 opposite the first end 210 and a main ball nut 204. The main ball screw 202 may be disposed proximate the motor 104. The main ball screw 202 may be operatively coupled to the motor 104 at the first end 210. The drive shaft stage 300 comprises a drive shaft end 302 and a drive shaft tube 304. The drive shaft end 302 may be coupled to the main ball nut 204. The drive shaft tube 304 may be coupled to the drive shaft end 302 at the first end 306 of the drive shaft tube 304. The second stage 400 comprises a second ball screw 402 and a second ball nut 404. The second ball nut 404 may be coupled to the drive shaft tube 304 at the second end 308 of the drive shaft tube 304. The main ball screw 202, the drive shaft stage 300, and the second ball screw 402 may share a central axis 120. A fail-safe lock 600 may be disposed between the motor 104 and the main stage 200. The fail-safe lock 600 may be disposed adjacent the first end 210 of the main ball screw 202. The mounting holes 118 on first and second ends 106, 108 of the security gate actuator 100 are used to couple the security gate actuator 100 to a structural support at the bottom with a pin 818, and a bollard 816 at the top with another pin 818 (FIGS. 3C-3D and 4B).

In particular embodiments, the motor 104 is configured to rotate the main ball screw 202 of the main stage 200. The main ball nut 204 of the main stage 200 translates the rotational motion of the main ball screw 202 into linear motion of the main ball nut 204. The main stage 200 couples to the drive shaft stage 300 through a slip joint 904 (FIGS. 4A and 4B). The slip joint 904 translates the rotational motion of the main ball screw 202 into linear and rotational motion of the drive shaft tube 304. As the main ball screw 202 rotates, the drive shaft tube 304 moves linearly and rotates. This rotational motion of the drive shaft tube 304 is translated to linear motion of the second ball screw 402, which in turn drives the bollard to move linearly, such as moving up from and down into the ground.

Figure 5A:
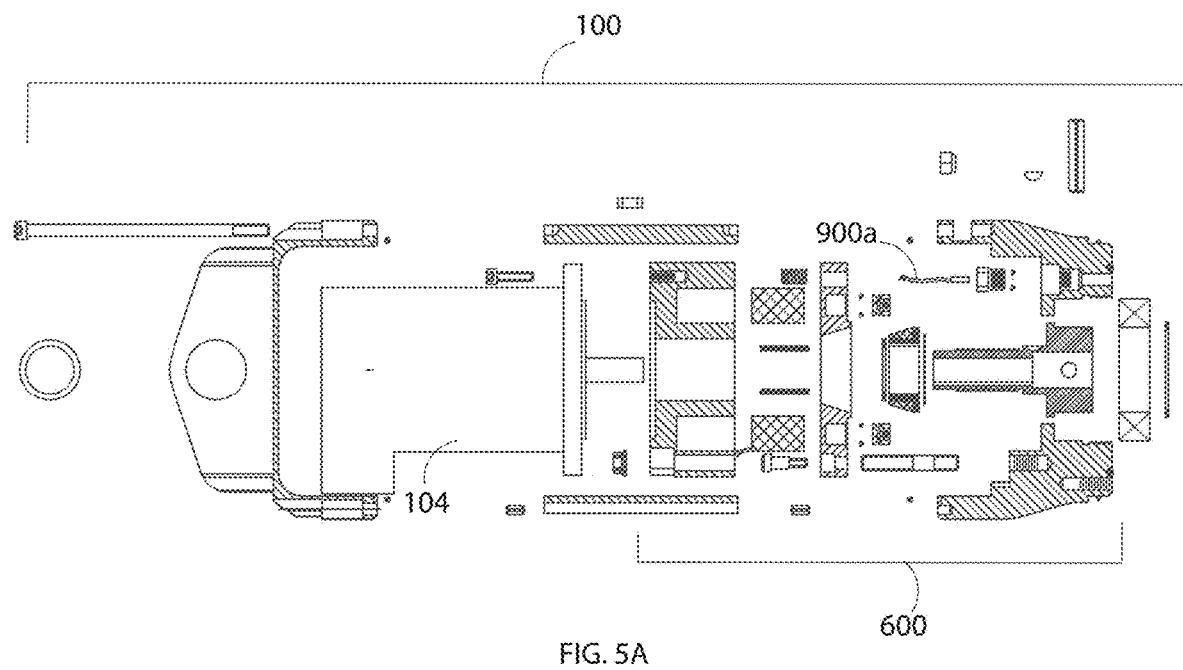
FIG. 5A is an exploded view of a section of the security gate actuator illustrated in FIGS. 4A-4B that includes the motor and the fail-safe lock.
Figure 5B:
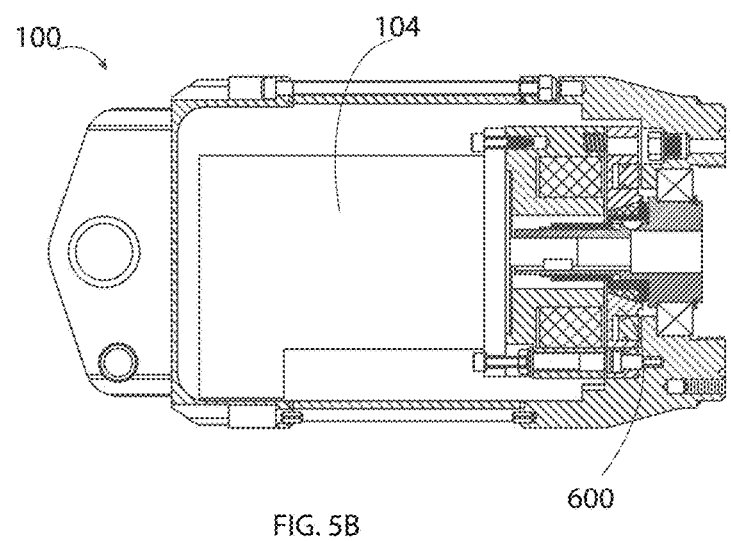
FIG. 5B illustrates the section of the security gate actuator illustrated in FIG. 5A.
Figure 6A:
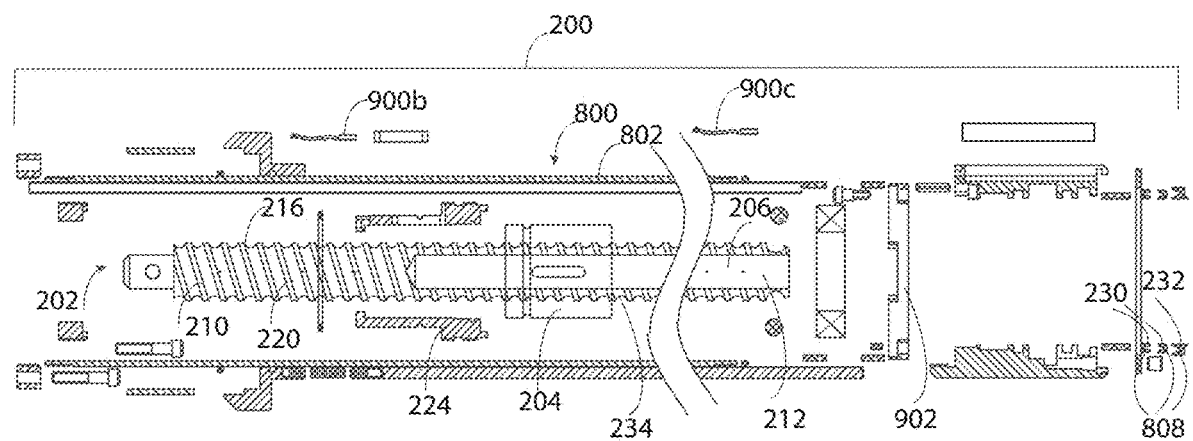
FIG. 6A is an exploded view of the main stage of the security gate actuator illustrated in FIGS. 4A-4B.
Figure 6B:
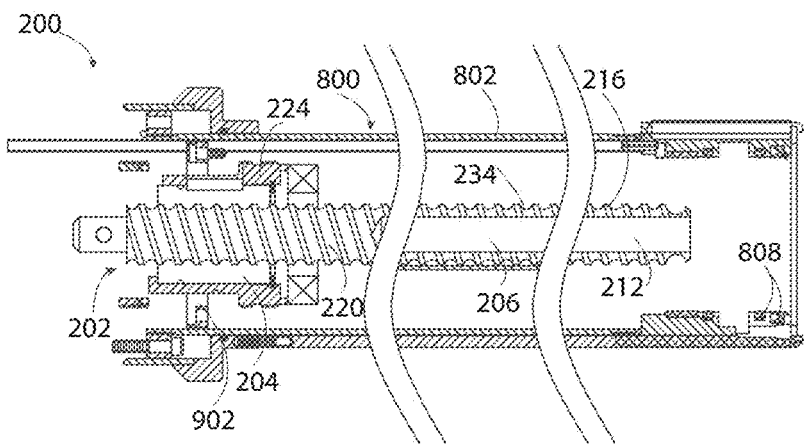
FIG. 6B illustrates the main stage of the security gate actuator illustrated in FIG. 6A.
Figure 7A:
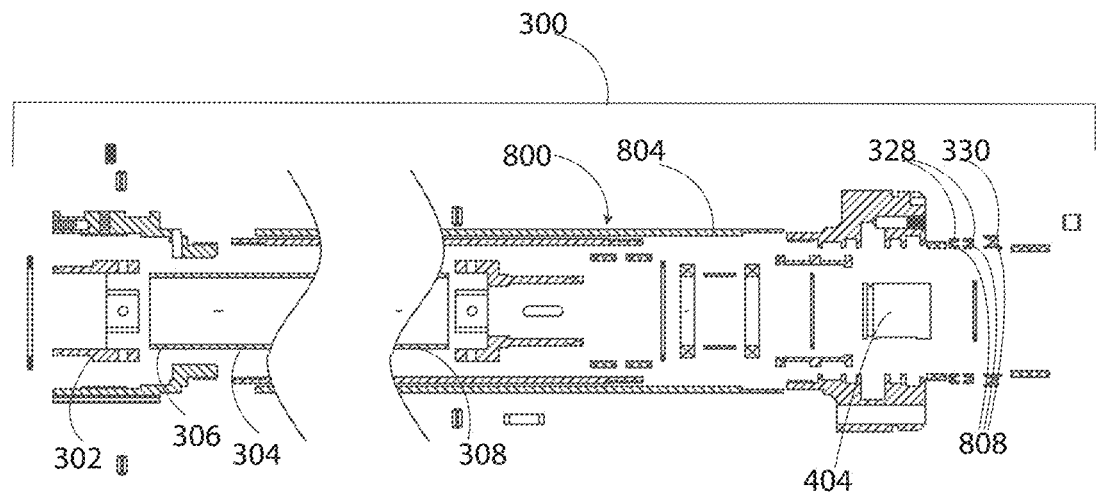
FIG. 7A illustrates an exploded view of the drive shaft stage of the security gate actuator illustrated in FIGS. 4A-4B.
Figure 7B:
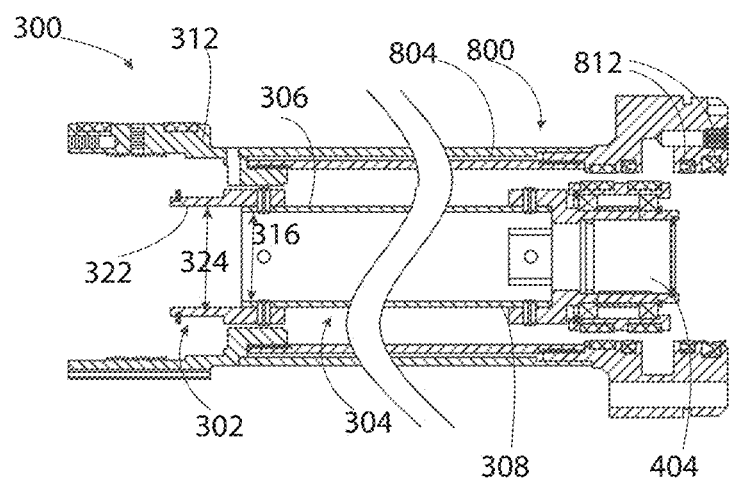
FIG. 7B illustrates the drive shaft stage of the security gate actuator illustrated in FIG. 7A.
Figure 8A:
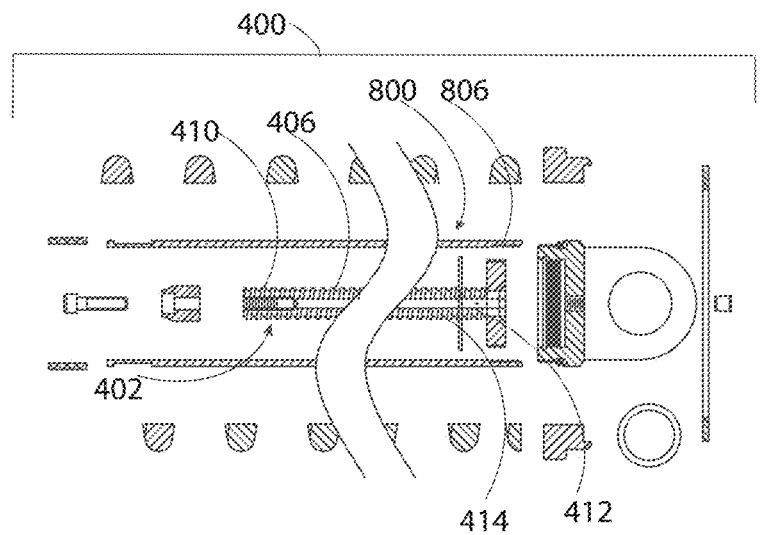
FIG. 8A is an exploded view of the second stage of the security gate actuator illustrated in FIGS. 4A-4B.
Figure 8B:
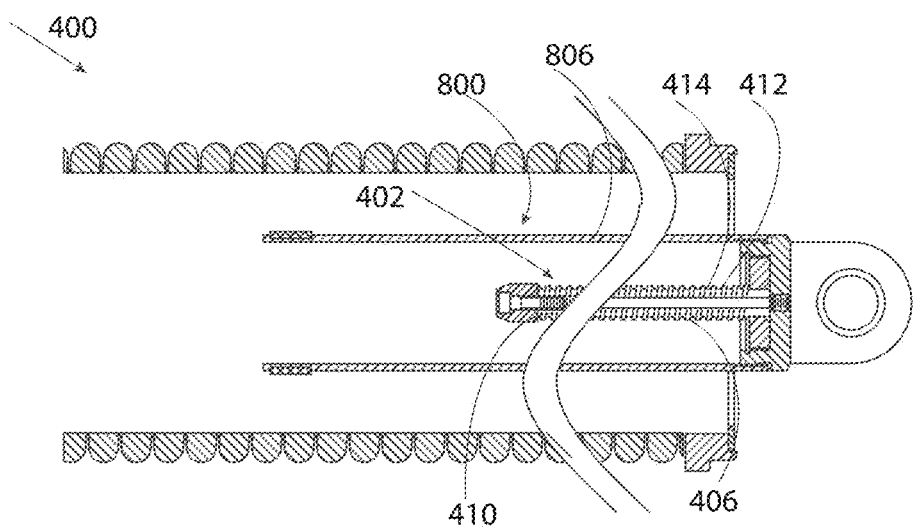
FIG. 8B illustrates the second stage of the security gate actuator illustrated in FIG. 8A.

Detailed views of sections of the security gate actuator 100 are provided in FIGS. 5A-8B. FIGS. 5A, 6A, 7A, and 8A are exploded views of the sections. FIGS. 5A and 5B illustrate the section of the security gate actuator 100 that includes the motor 104 and the fail-safe lock 600. FIGS. 6A-6B illustrate the main stage 200 of the security gate actuator 100. FIGS. 7A-7B illustrate the drive shaft stage 300 of the security gate actuator 100. FIGS. 8A-8B illustrate the second stage 400 of the security gate actuator 100.

In the main stage 200, the main ball screw 202 comprises main threads 216 disposed on an outer surface 234 of the main ball screw 202 (FIGS. 6A and 6B). The main ball nut 204 may be disposed around and coupled to the main threads 216. When the main ball screw 202 rotates, the main ball nut 204 moves linearly along the main threads 216. The drive shaft end 302 of the drive shaft stage 300 may be attached to the main ball nut 204 through a tube mount 312, which may be coupled to the nut mount 224 mounted around the main ball nut 204 (FIGS. 6A-7B, also see FIG. 4B). The drive shaft tube 304 may be coupled to the drive shaft end 302 at the first end 306 of the drive shaft tube 304. The drive shaft end 302 may comprise a core 322 having an inner diameter 324. The drive shaft tube 304 may comprise a square cuboid having a square base 314 (FIG. 9D). The side 316 of the square base 314 may be smaller than the inner diameter 324 of the core 322 of the drive shaft end 302 such that the first end 306 of the drive shaft tube 304 is disposed inside the drive shaft end 302. The linear motion of the main ball nut 204 is translated to linear motion of the drive shaft tube 304 through the drive shaft end 302 (see FIG. 4B). The drive shaft tube 304 comprises a second end 308 opposite the first end 306 (FIGS. 4B and 7B). The first end 306 may be positioned proximate the motor 104. The second end 308 may be positioned distal to the motor 104. The second ball nut 404 may be coupled to the drive shaft tube 304 at the second end 308 (FIG. 4B). The second ball screw 402 comprises second threads 406 disposed on the outer surface 414 of the second ball screw 402 (FIGS. 8A-8B). The second ball nut 404 may be disposed around and coupled to the second threads 406 (see FIG. 4B). When the drive shaft tube 304 rotates, the second ball nut 404 rotates around the second threads 406 and this rotational motion is translated to linear motion of the second ball screw 402. In particular embodiments, the ratio of the pitch of the main threads 216 to the pitch of the second threads 406 may be 2:1.

Figure 9A:
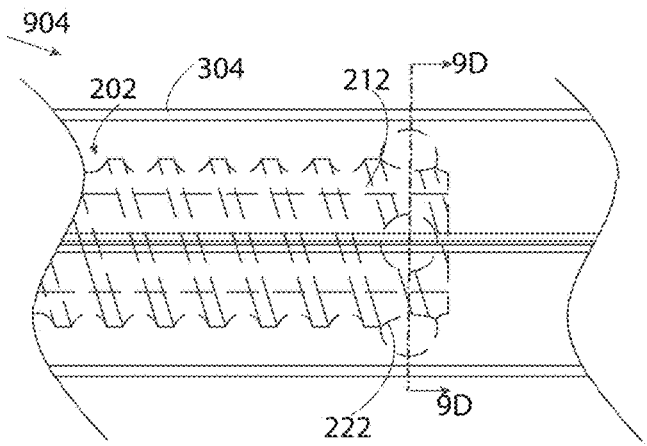
FIG. 9A illustrates a portion of an example slip joint.
Figure 9B:
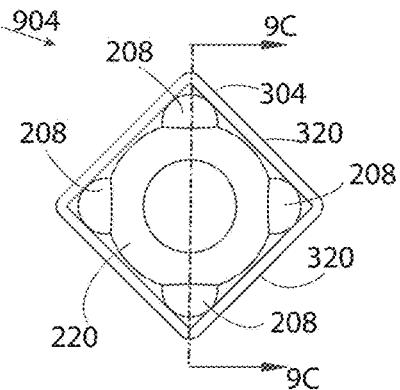
FIG. 9B illustrates the slip joint shown in FIG. 9A when viewed from the second end of the main ball screw.
Figure 9C:
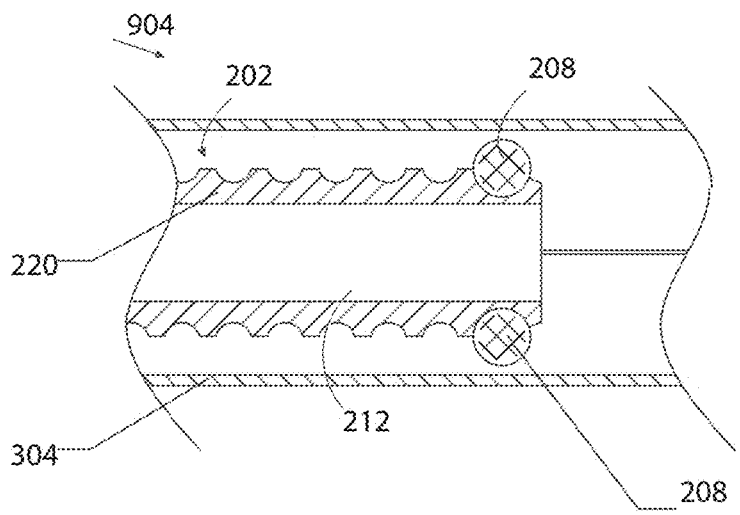
FIG. 9C illustrates a cross-sectional view of the slip joint illustrated in FIG. 9A along the cross-section line 9C-9C in FIG. 9B.
Figure 9D:
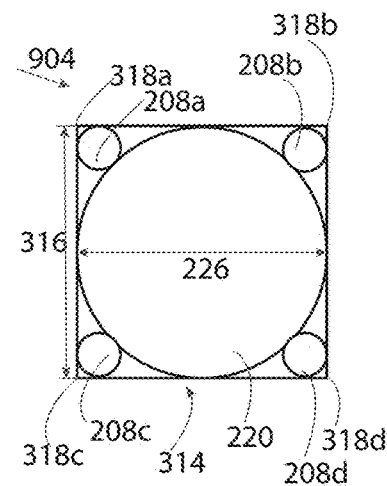
FIG. 9D illustrates another cross-sectional view of the slip joint illustrated in FIG. 9A along the cross-section line 9D-9D.

A slip joint 904 couples the main ball screw 202 of the main stage 200 with the drive shaft tube 304 of the drive shaft stage 300 (see FIGS. 4A-4B and 9A-9D). FIG. 9A illustrates part of the slip joint 904 that translates the rotational motion of the main ball screw 202 to rotational motion of the drive shaft tube 304. FIG. 9B illustrates the slip joint 904 when viewed from the second end 212 of the main ball screw 202. FIG. 9C is a cross-sectional view of the slip joint 904 along the cross-section line 9C-9C illustrated in FIG. 9B. FIG. 9D is a cross sectional view of the slip joint 904 along the cross-section line 9D-9D illustrated in FIG. 9A.

The slip joint 904 may further comprise one or more drive balls 208. The main ball screw 202 may comprise a circular channel 222 on the screw body 220 of the main ball screw 202. The circular channel 222 may be disposed proximate the second end 212 of the main ball screw 202. The drive ball 208 may be disposed in the circular channel 222. The drive shaft tube 304 may comprise a square cuboid having a square base 314. The side 316 of the square base 314 is greater than the outer diameter 226 of the screw body 220 such that the second end 212 of the main ball screw 202 is disposed inside the drive shaft tube 304. Each of the drive balls 208 may be disposed adjacent the vertices 318 of the square base 314 and adjacent the two joining faces 320 of the drive shaft tube 304. When the main ball screw 202 rotates, each of the drive balls 208 pushes against at least one of the two joining faces 320 of the drive shaft tube 304 and pushes the drive shaft tube 304 to rotate. As a result, the rotational motion of the main ball screw 202 is translated into rotational motion of the drive shaft tube 304. When two drive balls 208a, 208d are installed in the slip joint 904, the two drive balls 208a, 208d may each be disposed adjacent two diagonal vertexes 318a, 318d of the square base 314 to balance the forces generated by the two drive balls 208a, 208d. In particular embodiments, the slip joint 904 comprises four drive balls 208a, 208b, 208c, 208d disposed adjacent each of the vertices 318a, 318b, 318c, and 318d of the square base 314 such that the forces generated by the drive balls disposed diagonally from each other are balanced. The number of sides of the base of the drive shaft tube may be more or less than four. For example, the base of the drive shaft tube may have three, six, or eight sides.

The security gate actuator 100 may further comprise a power-assist spring 500 surrounding the main stage 200, the drive shaft stage 300, and the second stage 400 (FIGS. 4A-4B). The power-assist spring 500 may be coupled to the drive shaft stage 300. The power-assist spring may comprise a first end 502 proximate the motor and a second end 504 proximate a second end of the second ball screw. Because the drive shaft stage is coupled to the main ball screw nut, the force of the power-assist spring may be transferred to the main ball screw nut through the drive shaft stage and converted into rotational torque. In this way, the power-assist spring supplements the power of the motor 104. In some instances, the motor can be made smaller and more energy-efficient by incorporating a power-assist spring to assist the load requirements of the motor when the security gate actuator is extending and to reduce the load on the motor when the security gate actuator is retracting.

For setting upper and lower limits of raising and lowering a bollard, conventional systems use magnetic sensors. However, these are known to lose accuracy and fail due to debris that interferes with the sensors and result in a significant number of service calls to repair or clean the sensors. Particular embodiments of a security gate actuator 100 comprise position sensors 900 integrated into the security gate actuator 100 (FIGS. 5A and 6A). The security gate actuator 100 may further comprise a magnet 902. The magnet 902 may be disposed adjacent the drive shaft stage 300, such as adjacent the drive shaft end 302. The magnet 902 triggers the position sensors as the security gate actuator 100 extends and retracts. In some embodiments, a first position sensor 900a is positioned adjacent the first end 210 of the main ball screw 202, a second position sensor 900b is positioned adjacent the second end 212 of the main ball screw 202, and a third position sensor 900c is positioned between the first and second end 210, 212 of the main ball screw 202 for the actuator system 150 to measure the relative position of the drive shaft stage 300. The position sensors 900 relay to the programmed logic control 102 the position of the drive shaft stage in relation with the security gate actuator housing. With this information, the program logic control may be programmed to slow the security gate actuator down for "soft stops" and "alarm" if the security gate actuator makes a non-commanded move. The position sensors may also be used to signal the control of gates, traffic lights, or other auxiliary functions of security gates based on the relative position of the bollards in their up and/or down cycle. The position sensors may be located inside the security gate actuator so they are not exposed to the environment.

The main ball screw, the drive shaft stage, and the second ball screw may be constructed in a way such that they telescope into one another to reduce space. Although the embodiments of a security gate actuator disclosed herein may be used in original system builds and are, therefore, not required to be small, particular embodiments of the security gate actuator disclosed herein are specifically sized to fit into a replacement position for a hydraulic actuating unit. The security gate actuator may incorporate bearings and wear-bands to support all the rotating and sliding components. The bearings and wear-bands may be lubricated for the life of the security gate actuator. In some instances, oil-lube reservoirs may be incorporated into the security gate actuator so that the seals may be lubricated over the life of the security gate actuator. If the lubricant gets low, additional lubricant may be added by refurbishing the security gate actuator and refilling the oil. In some embodiments, the security gate actuator 100 is telescoped to extend the range of the bollards in and out of the ground. FIGS. 4A and 4B illustrate the security gate actuator 100 when the security gate actuator 100 in a fully retracted position (FIG. 4A) and in a fully extended position (FIG. 4B). When the security gate actuator 100 is in a fully retracted position, the majority of the main ball screw 202 is disposed inside the drive shaft tube 304 and a majority of the second ball screw 402 is disposed inside the drive shaft tube 304. When the security gate actuator 100 is in a fully-extended position, the first end 306 of the drive shaft tube 304 is disposed adjacent the second end 212 of the main ball screw 202 and a first end 410 of the second ball screw 402 is disposed adjacent the second end 308 of the drive shaft tube 304. The main ball screw 202 may further comprise a tunnel 206 inside the screw body 220 (FIGS. 6A-6B). The tunnel 206 may extend from the second end 212 of the main ball screw 202 into the screw body 220. A portion of the second ball screw 402 may be disposed in the tunnel 206 when the security gate actuator 100 is in a fully retracted position (FIG. 4A).

Figure 10A:
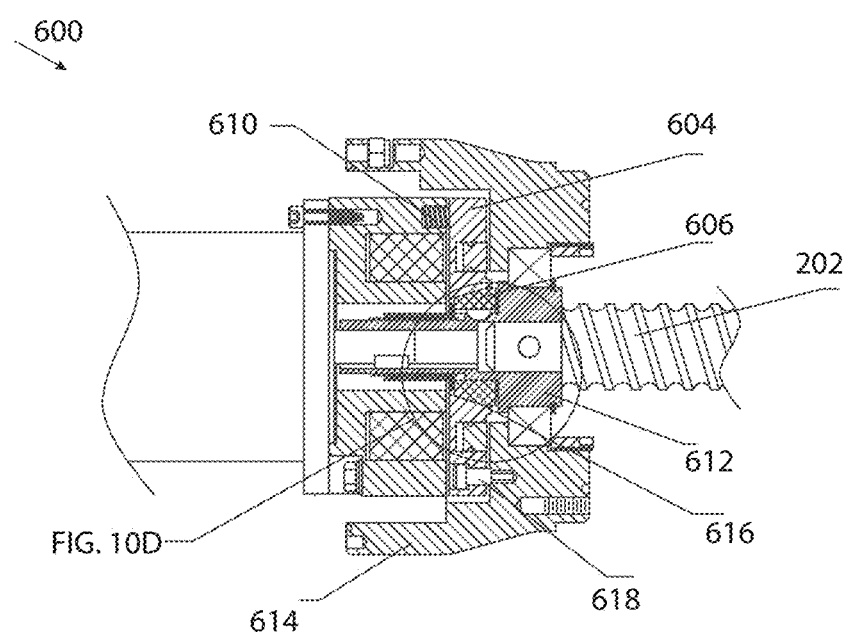
FIG. 10A illustrates the fail-safe lock illustrated in FIG. 5B when the fail-safe lock is engaged.
Figure 10B:
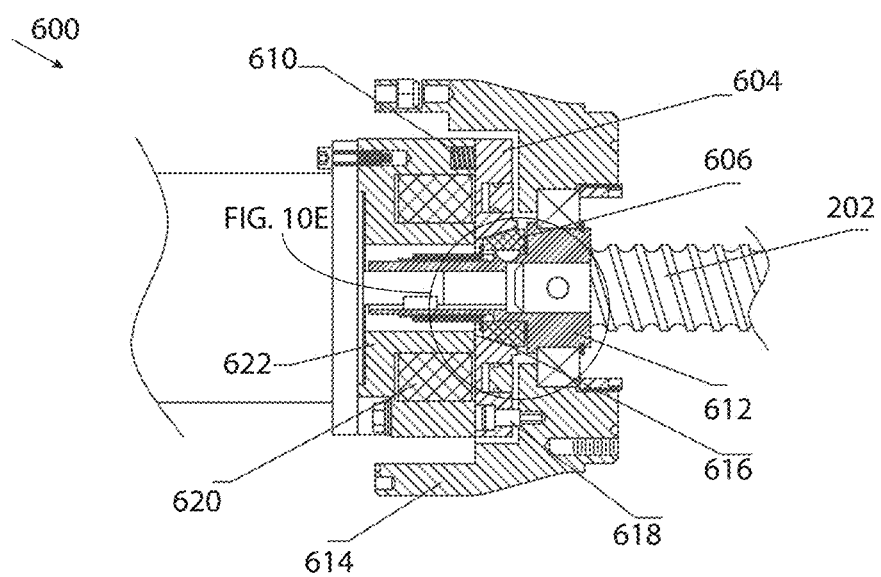
FIG. 10B illustrates the fail-safe lock illustrated in FIG. 10A when the fail-safe lock is disengaged.
Figure 10C:
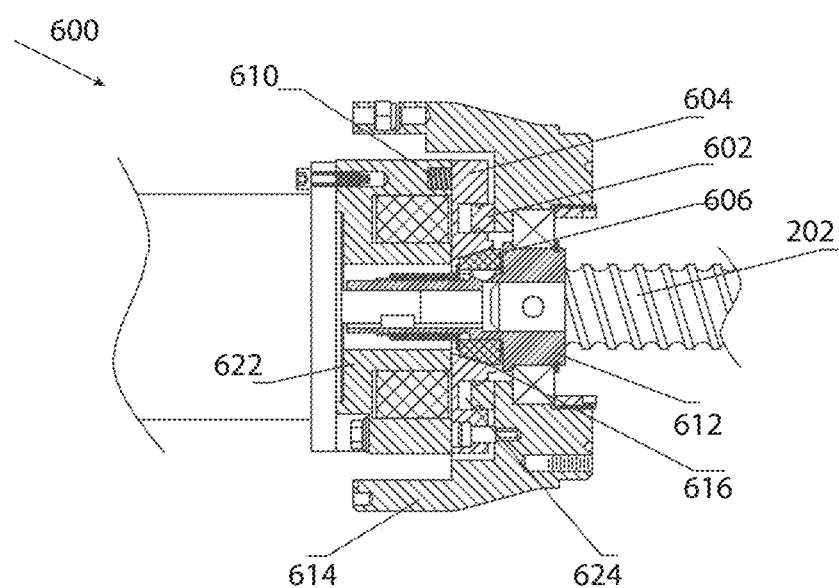
FIG. 10C illustrates the fail-safe lock illustrated in FIG. 10A when the fail-safe lock is manually disengaged.
Figure 10D:
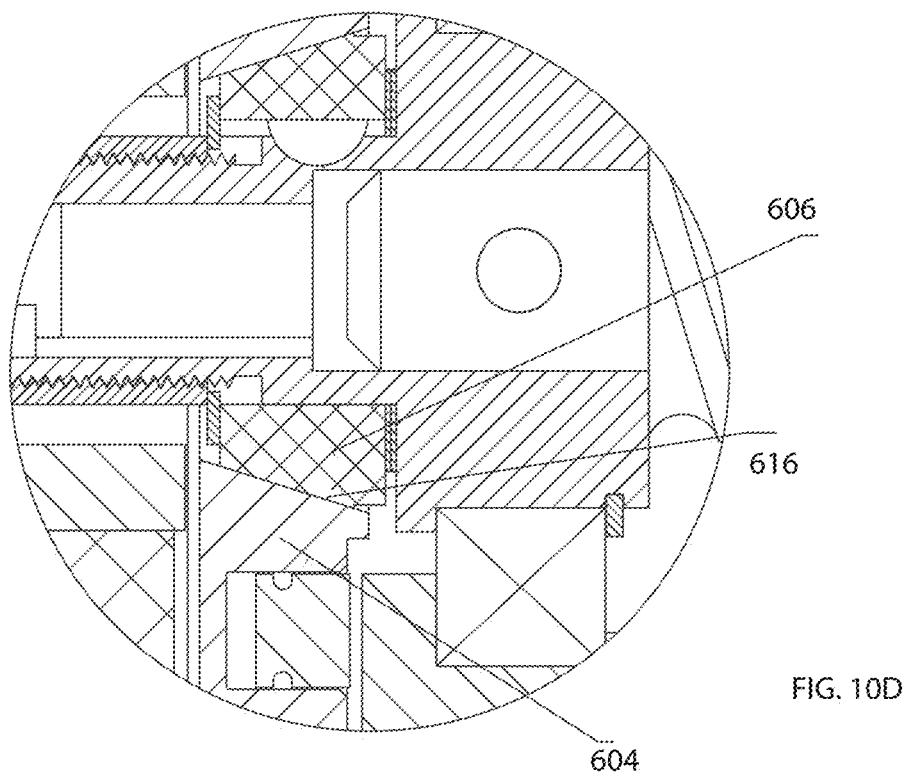
FIG. 10D is a close-up view of the fail-safe lock illustrated in FIG. 10A.
Figure 10E:
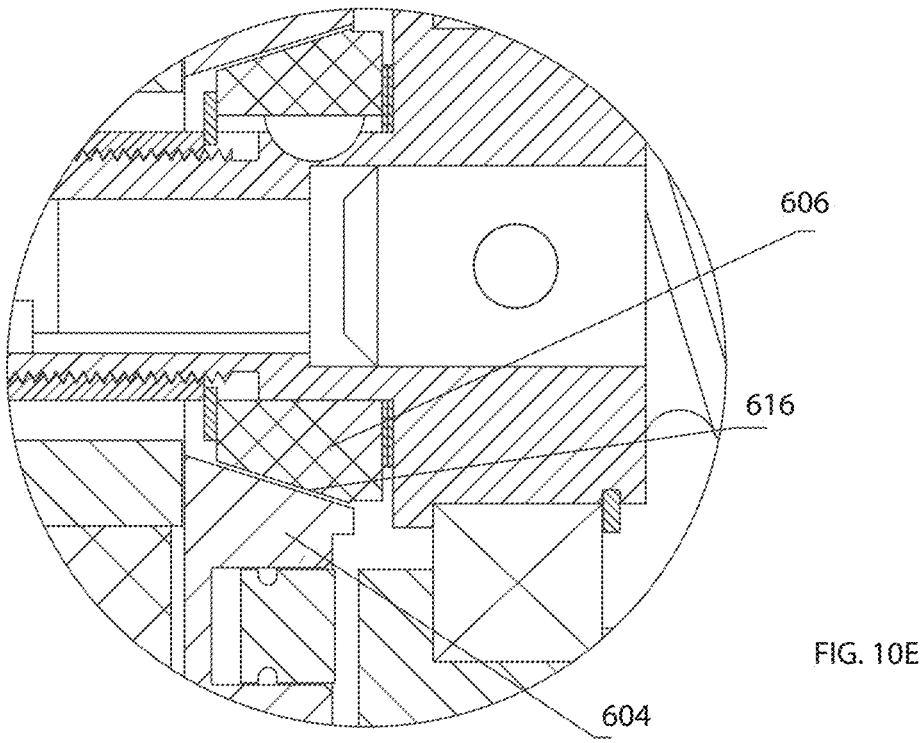
FIG. 10E is a close-up view of the fail-safe lock illustrated in FIG. 10B.

A fail-safe lock 600 may be used to lock the position of the security gate actuator 100 (FIGS. 4A-4B, 5A-5B, 10A-10G). FIG. 10A illustrates the fail-safe lock 600 is in an engaged position, where the fail-safe lock 600 locks the main ball screw 202. FIG. 10B illustrates the fail-safe lock 600 is in a disengaged position, where the main ball screw 202 is allowed to rotate. FIG. 10C illustrates the fail-safe lock 600 is manually disengaged when all power is out. FIGS. 10D and 10E illustrate close-up views of the fail-safe lock 600 when it is engaged (FIG. 10D) or disengaged (FIG. 10E). The fail-safe lock 600 may comprise a lock end 606 and a lock star 604. The lock end 606 may be attached to the drive bushing 612, which is attached to the main ball screw 202. The lock end 606, the driving bushing 612, and the main ball screw 202 may be mechanically locked to each other (FIG. 10A). In particular embodiments, to engage the fail-safe lock 600, force is applied to the lock star 604 by lock springs 610, and causes the lock star 604 to push against and be in close contact with the tapered end 616 of the lock end 606 (FIG. 10D). The friction between the lock star 604 and the lock end 606 lock them together. The lock star 604 is restricted from rotating by the shoulder bolts 618, which are threaded into the case 614. As a result, the main ball screw 202 does not rotate further, and the fail-safe lock is used to lock the security gate actuator at any position.

In particular embodiments, to disengage the fail-safe lock 600, electric power, e.g., DC power, is applied to the lock coil 620 (FIG. 10B). The lock coil 620 forms a magnetic field with the motor mount 622. The magnetic field overcomes the force of the lock spring 610 and pulls in the lock star 604 until the lock star 604 makes contact with the motor mount 622. The lock star 604 and the lock end 606 are separated, having a gap next to the tapered end 616 of the lock end 606 (FIG. 10E). This allows the main ball screw 202 to rotate freely.

The fail-safe lock may be manually disengaged. In some embodiments, a pneumatically controlled lock release is incorporated into the fail-safe lock (FIG. 10C). This allows the lock to be disengaged in the absence of all electrical power so that the bollard of the security gate actuator can be raised or lowered manually. Access to the pneumatic control may be located in the control cabinet. To manually disengage the fail-safe lock 600, pressurized air is applied to the air cavity by the air pump of the manual lock release system 750 (illustrated in FIG. 10F). As pressurized air fills the air cavity 624, piston 602 is forced out and pushes against the case 614. This force overcomes the force of lock spring 610 and pushes lock star 604 until the lock star 604 makes contact with motor mount 622. The lock star 604 and the lock end 606 are separated, having a gap next to the tapered end 616 of the lock end 606 (FIG. 10E). This allows the main ball screw 202 to rotate freely.

Figure 10F:
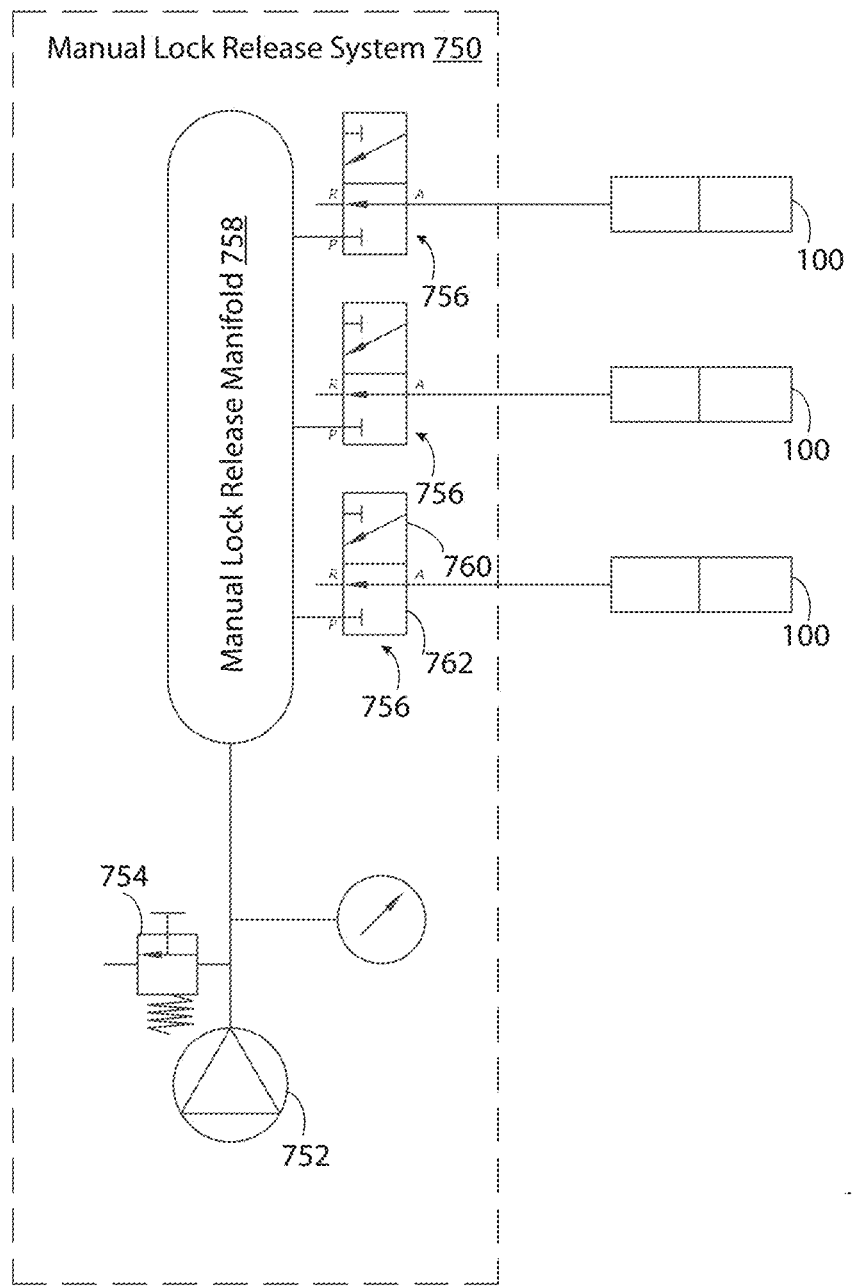
FIG. 10F illustrates an example manual lock release system for manually release the fail-safe lock as illustrated in FIG. 10C.
Figure 10G:
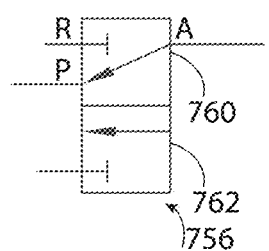
FIG. 10G illustrates the valve used in the manual lock release system illustrated in FIG. 10F when the fail-safe lock is manually disengaged.

FIG. 10F illustrates an example manual lock release system 750. In particular embodiments, the manual lock release system 750 comprises a hand pump 752 and an air dump 754. The manual lock release system 750 may further comprise one or more valves 756. The valve 756 may comprise three ports A, R, and P. Each of valves 756 may be connected to a corresponding security gate actuator 100. Port A is connected to the security gate actuator 100. Port P is connected to the manual lock release manifold 758. When the manual lock release is not in use, the valve 756 is closed for the corresponding security gate actuator 100, where the second block 762 of the valve 756 is in use such that port P is blocked and port A is connected with port R to release air coming from the security gate actuator 100. To manually release the fail-safe lock, the valve 756 is adjusted such that port A is connected with port P (FIG. 10G). In the valve 756 illustrated in FIG. 10G, the first block 760 is in use such that ports A and P are connected and port R is blocked. The air hand pump 752 is used to apply pressurized air to the air cavity 624 in the security gate actuator 100 to manually disengage the fail-safe lock 600. The air dump 754 is used to remove pressurized air and consequently the fail-safe lock 600 is reapplied. The manual lock release system 750 may be located inside a control cabinet.

In particular embodiments, the housing 800 comprises a main stage housing 802, a drive shaft stage housing 804, and a second stage housing 806 (FIGS. 6A-8B). The security gate actuator 100 may further comprise a first seal 808 between the main stage housing 802 and the drive shaft stage housing 804. The security gate actuator 100 may further comprise a second seal 812 between the drive shaft stage housing 804 and the second stage housing 806. In some embodiments, the first seal 808 comprises first rod seals 230 and first wipers 232 (FIGS. 6A-6B). The second seal 812 comprises second rod seals 328 and second wiper 330. The wipers 232, 330 wipe debris off the exterior of the housing 800 when the security gate actuator 100 retracts or extends. The seals 808, 812 restrict debris from getting inside the housing 800 and help preserve the positive pressure inside the security gate actuator 100.

One concern for telescoping apparatuses is that when the unit extends, it creates a vacuum that could draw air in from the environment. That incoming air may also include dust, water, and other contaminants that, over time, may degrade the workings of the security gate actuator. A positive air system may be included within the system to provide positive pressure of clean air, thus eliminating a vacuum within the security gate actuator housing. Air for the positive air system may be included through a pump controlled by a control in the control cabinet. In particular embodiments, the positive air system may be configured to supply a small, constant positive air pressure to the security gate actuator housing to limit the ingress of water and other contaminants into the system. The security gate actuator may be constructed of anodized aluminum parts to further extend its life.

Figure 11:
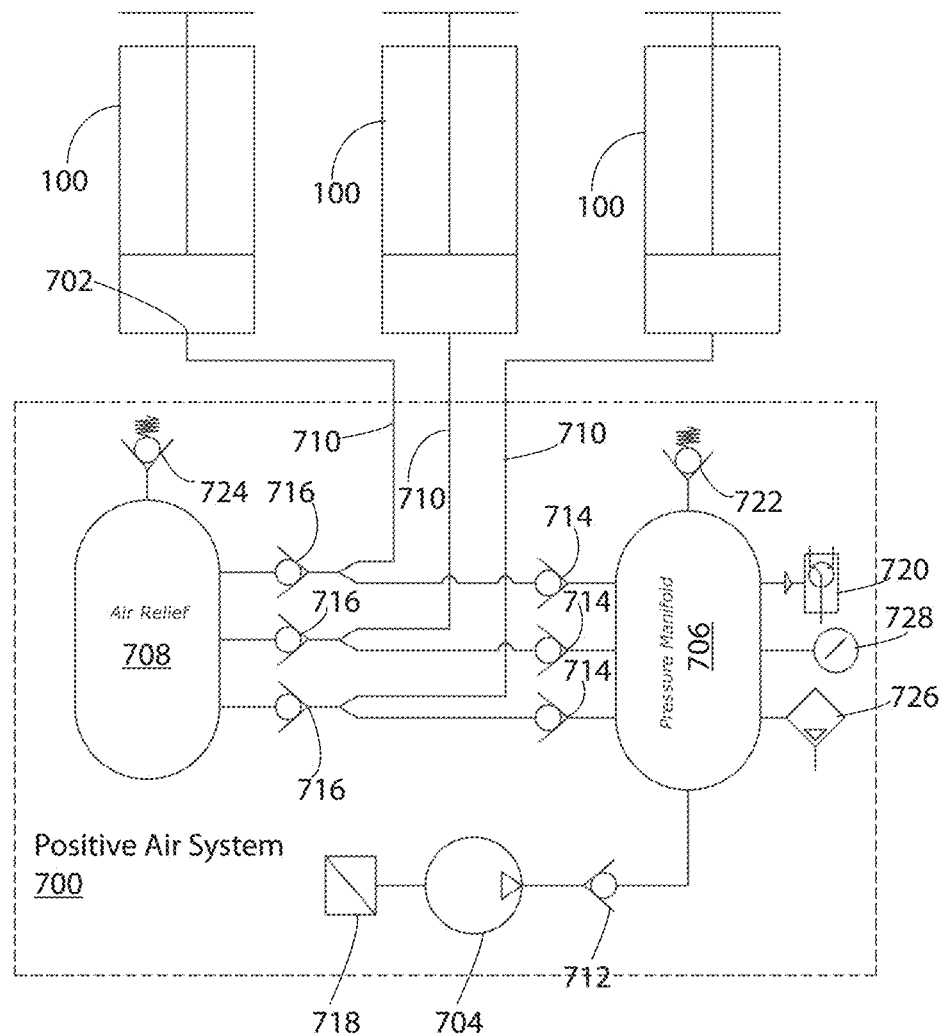
FIG. 11 illustrates an example positive air system illustrated in FIGS. 3A-3B.

FIG. 11 illustrates a schematic diagram of an example positive air system 700. The positive air system 700 may be located inside the control cabinet. The positive air system 700 connects to the air manifold 702 of the security gate actuator 100 through the air lines 710. The positive air system 700 may comprise an air compressor 704, a pressure manifold 706, and an air relief 708. The positive air system 700 may further comprise a first check valve 712 disposed between the air compressor 704 and the pressure manifold 706, a second check valve 714 disposed between the pressure manifold 706 and the security gate actuator 100, and a third check valve 716 disposed between the air relief 708 and the security gate actuator 100. The check valves 712, 714, 716 may be one directional, which means that air may go through the valve in one direction, but may be restricted from going through in the opposite direction. In particular embodiments, when the positive air system is turned on, air flows through the air filter 718, is pressurized at the air compressor 704, passes through the first check valve 712, and is stored in the pressure manifold 706. The pressure at the pressure manifold may be 10 psi. The pressure gauge 728 measures the pressure at the pressure manifold. The pressure transducer 720 allows the programmed logic control 102 to monitor the air pressure in the pressure manifold 706 and turn the air compressor on and off as needed. As the security gate actuator 100 extends, the air pressure inside the security gate actuator 100 drops. If the pressure goes below a first level, e.g., 10 psi, air may flow from the pressure manifold through the second check valve 714 to the security gate actuator 100. The second check valve 714 is one directional such that air is restricted from flowing from the security gate actuator 100 back to the pressure manifold 706. Air also flows into the air relief, but because of the third check valve 716, air is restricted from flowing out of the air relief 708. As the security gate actuator 100 retracts, air pressure inside the security gate actuator 100 increases. The air of increased pressure is restricted from flowing into the pressure manifold 706 because of the one-directional second check valve 714. Air therefore flows into the air relief 708. If pressure in the air relief 708 raises above a second level, e.g., 30 psi, the second relief valve 724 vents the air to atmosphere. Each security gate actuator may be individually connected to the positive air system through a separate air line 710, a separate first check valve 712, and a separate second check valve 714. If one security gate actuator develops an air leak, air pressure from the other security gate actuators will not be lost. Therefore each security gate actuator is isolated. If air pressure were to rise above a third level, e.g., 15 psi, in the pressure manifold 706, the first relief valve 722 vents air to atmosphere to lower the pressure. The drain solenoid 726 is controlled by the programmed logic control 102. It is used to drain accumulated moisture from the pressure manifold 706.

One concern with an electrically-operated system is what to do when the power goes out. In addition to some embodiments including a pneumatically-controlled lock release to allow the security gate actuator to be raised and lowered manually in an emergency, because the system is intended for electrical operation, particular embodiments may comprise a battery backup 110 connected to the security gate actuator 100 (FIGS. 3A-3B). It has been found that due to the low electrical power requirements of systems configured as described herein, an actuator can be operated as many as 100 times after losing all power input other than the battery backup. This ability to operate the system from a battery backup is a significant advantage to other pneumatic and hydraulic systems that are not functional after a power outage. Also, because the system is electrically operated, rather than hydraulic or pneumatic, it can maintain the same raising and lowering speed irrespective of the environmental temperature, providing more consistent and reliable service.

The security gate actuator may be run with DC power entirely such that the operation of the security gate is not affected by power outage or shortage.

The programmed logic control 102 is coupled to other components of the security gate actuator 100, such as the main stage 200, the drive shaft stage 300, the second stage 400, and the fail-safe lock 600. The programmed logic control 102 is also coupled to other components of the actuator system 150, such as the manual lock release system 750 and the positive air system 700. The programmed logic control may be located in a control cabinet close to or remote from the security gate actuator. When the program logic control sends a moving signal to the security gate actuator, the fail-safe lock of the security gate actuator may be energized to disengage, and the motor may be commanded to rotate in the extending or retracting direction and at a specified speed, such as at a specified rotation per minute.

Conventional ball screws being used in other industries are only sufficient to raise 12-16 inches of height and so are not useful to raise a bollard where the bollard needs to raise 24-40 inches. Because of the limited space available when replacing the actuating unit of a system built for a conventional hydraulic actuating unit, a conventional ball screw is not feasible. By adapting the main ball screw with other parts such as a slip joint, a drive shaft stage, and a second stage, the security gate actuator disclosed herein is able to be adapted to achieve the required rise length.

Besides being more reliable than the conventional hydraulic and pneumatic actuators, the security gate actuators disclosed herein use electrical power, instead of hydraulic or pneumatic power, which has a swift response time and does not have messy oil to deal with. Each security gate actuator may be individually controlled and operated. If one security gate actuator fails, other security actuators can still function normally. The security gate actuators are of similar sizes as those of hydraulic or pneumatic actuators and, therefore can be retro-fitted into the space left with hydraulic or pneumatic actuators if replacing the hydraulic or pneumatic actuators with the security gate actuators described herein is needed. The security gate actuators disclosed herein also are not affected by the outside temperature because they are operated by electricity.

Figure 12A:
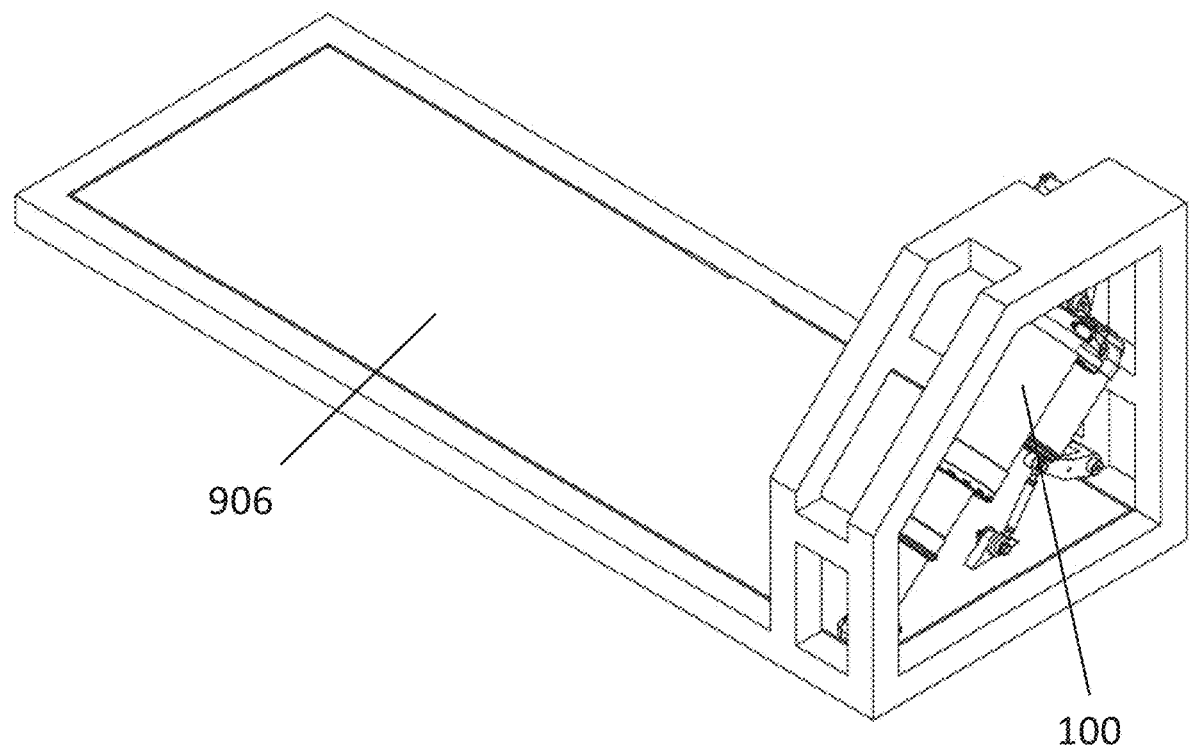
FIG. 12A illustrates a perspective view of an implementation of a security gate actuator attached to a wedge plate barrier in an open position.
Figure 12B:
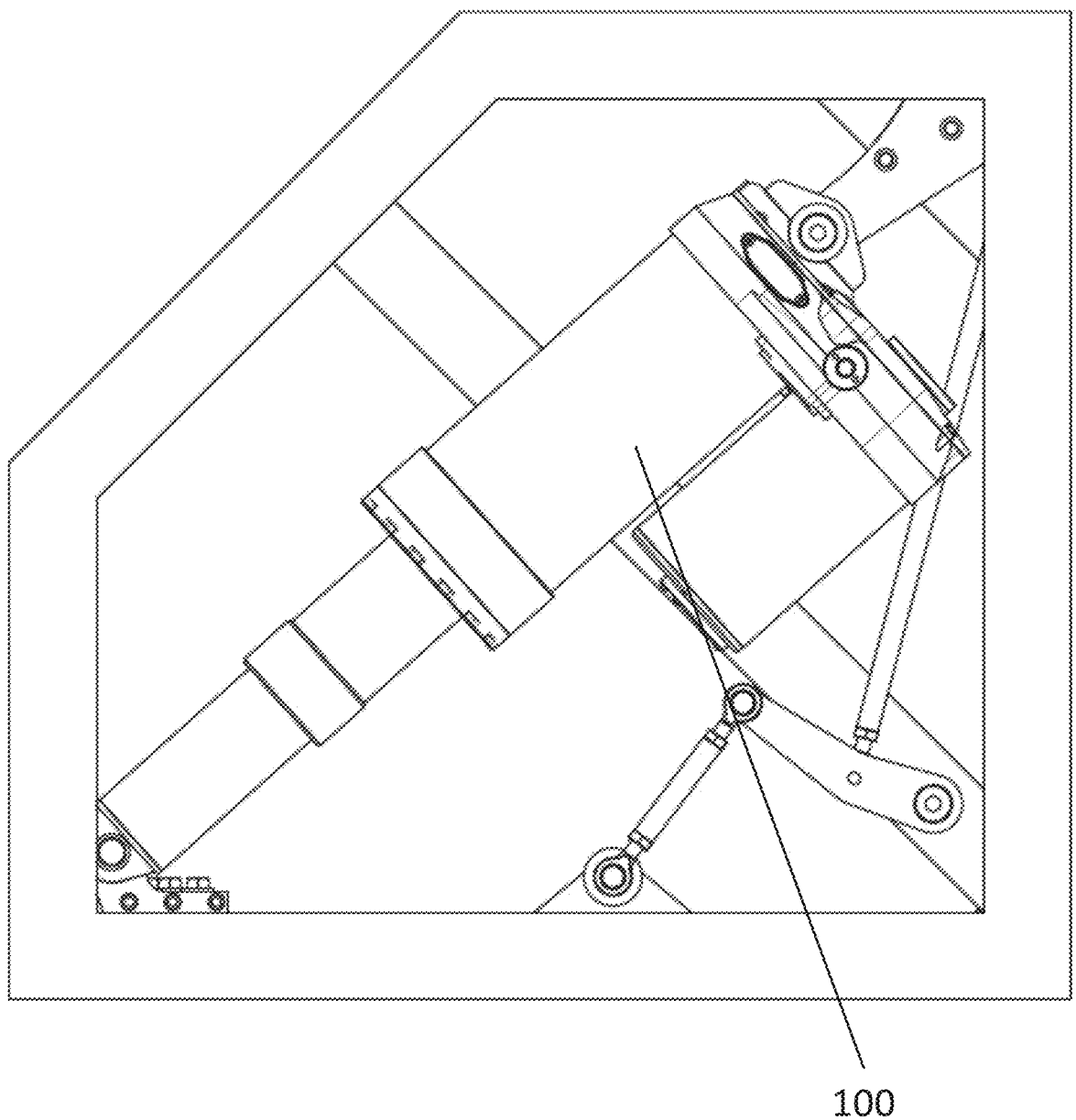
FIG. 12B illustrates a side view of the security gate actuator from FIG. 12A.
Figure 13A:
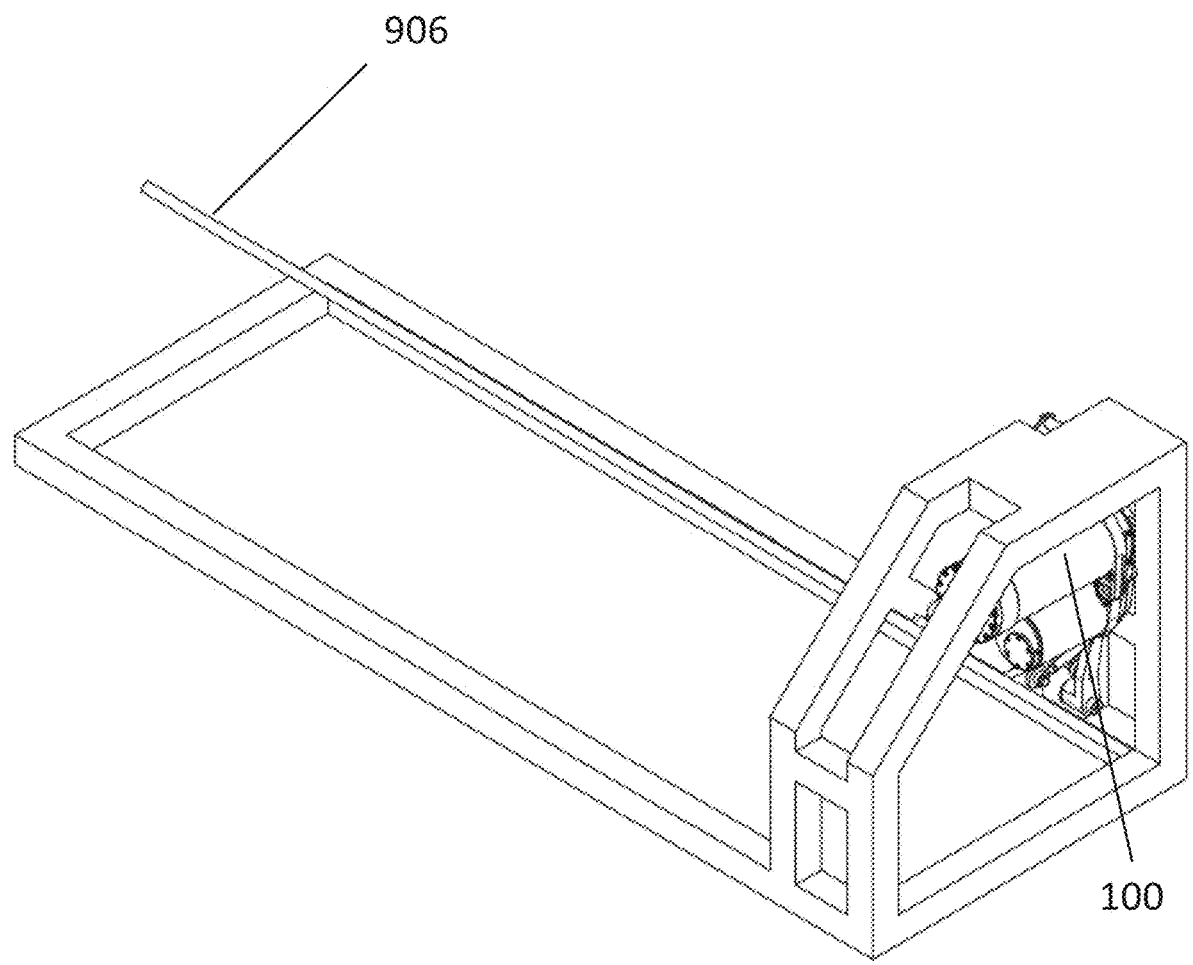
FIG. 13A illustrates a perspective view of the security gate actuator from FIG. 12A with the wedge plate barrier in a closed position.
Figure 13B:
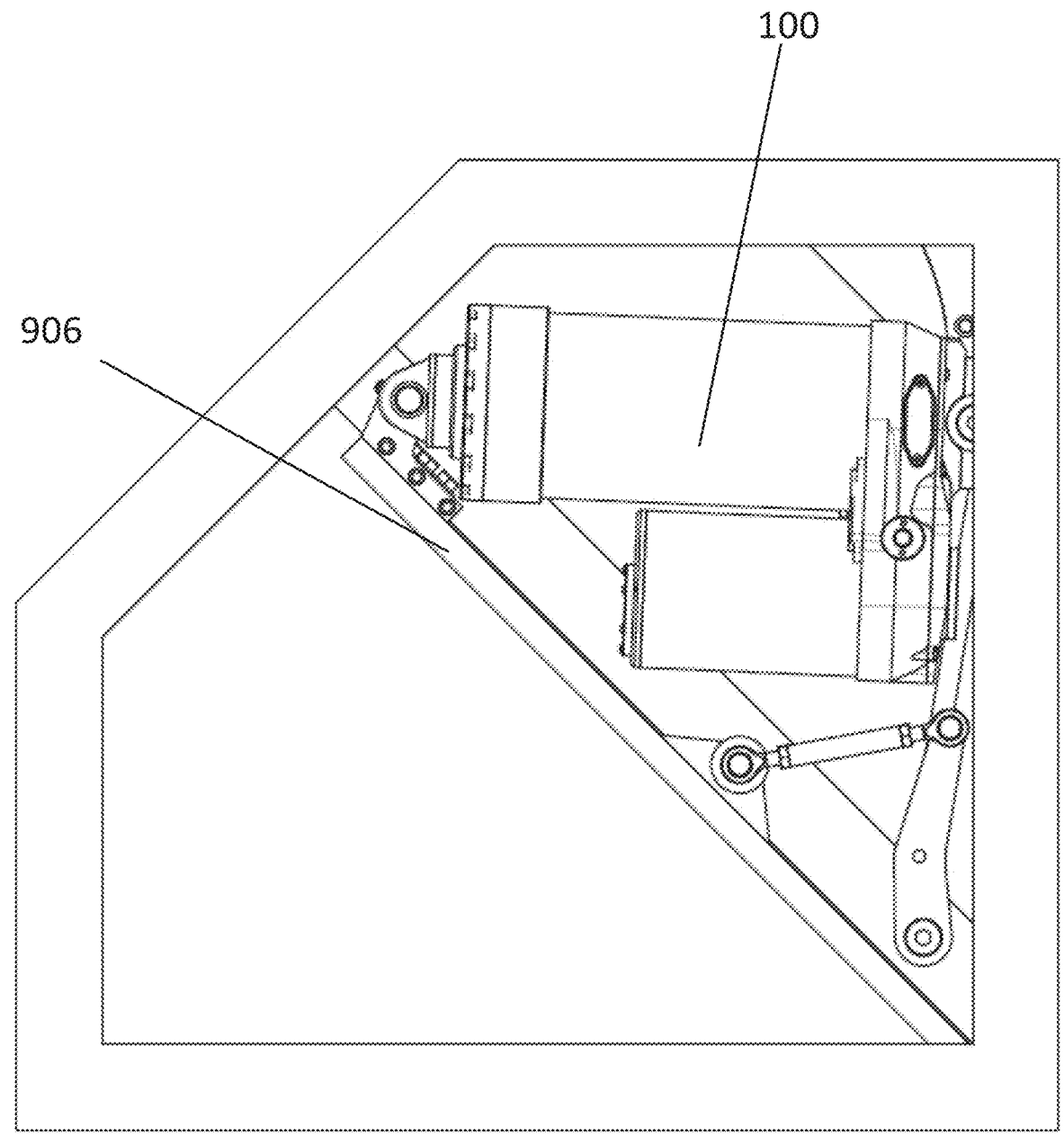
FIG. 13B illustrates a side view of the security gate actuator from FIG. 13A
Figure 14:
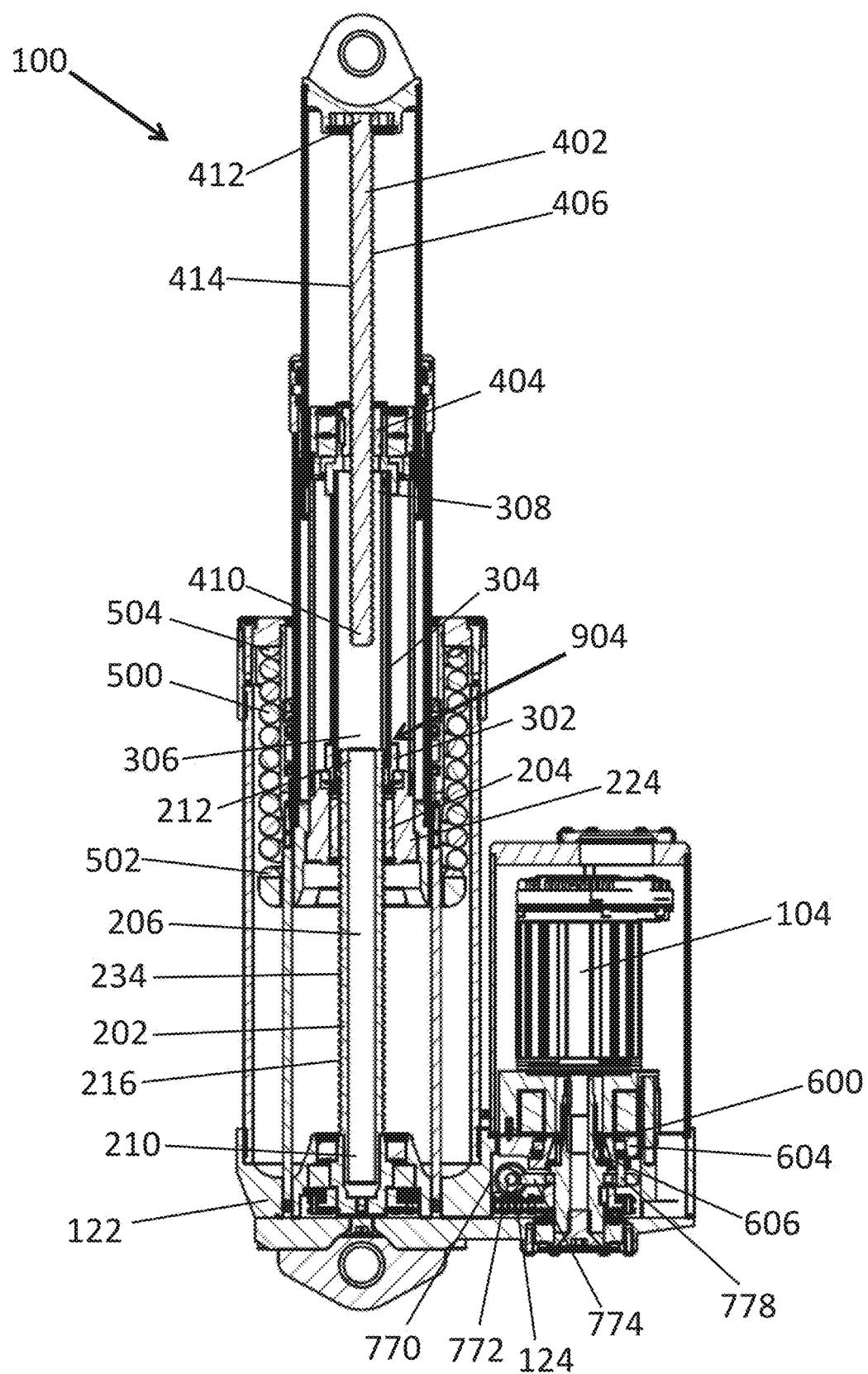
FIG. 14 illustrates a cross-sectional view of the security gate actuator from FIG. 12A in a fully-extended position.
Figure 15:
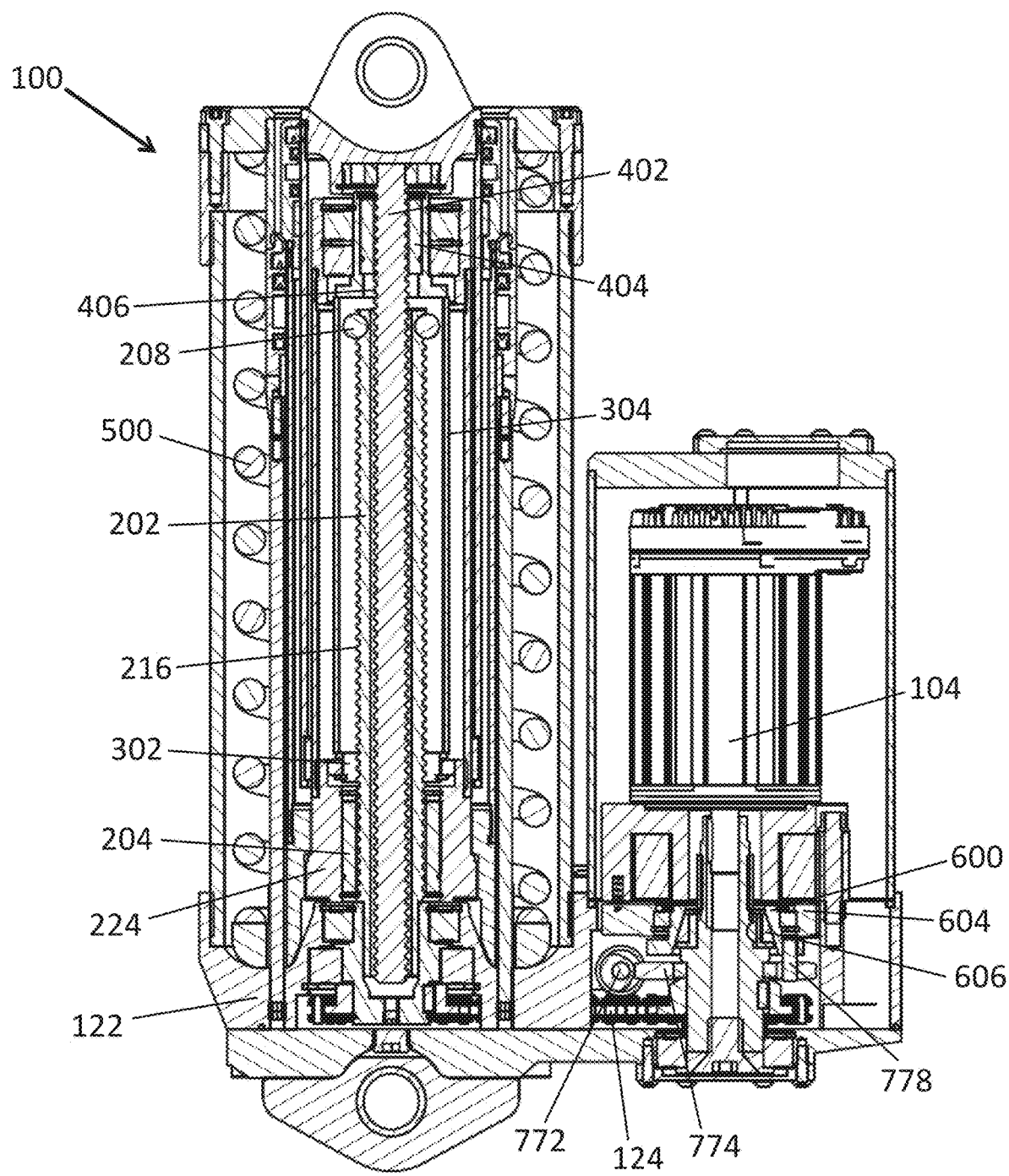
FIG. 15 illustrates a cross-sectional view of the security gate actuator from FIG. 12A in a fully-retracted position.

FIGS. 12-17 illustrate another embodiment of the security gate actuator 100. As shown in FIGS. 12-13, the security gate actuator 100 may be used to lift or lower a wedge plate barrier 906. This embodiment functions largely in the same way as the embodiment disclosed above, using the same actuator 100, but with a different drive mechanism. As illustrated in FIGS. 14-15, the motor 104 may not be aligned with the central axis 120 of the main ball screw 202. The security gate actuator 100 and the motor 104 may be mounted on a base 122, with the security gate actuator 100 and the motor 104 adjacent to each other. To provide rotational motion, the motor 104 rotates a chain 124 that is rotationally coupled with the main ball screw 202.

A power assist spring 500 may be used to aid the motor 104 in closing the pathway to vehicles. Because this embodiment closes the pathway when the security gate actuator 100 is fully retracted, the power assist spring 500 is configured to be compressed when the security gate actuator 100 is extended. When the security gate actuator 100 retracts from the fully extended position, the energy from the compressed power assist spring 500 assists the motor 104 in turning the main ball screw 202.

As with the previous embodiment, the security gate actuator 100 may have a fail-safe lock 600. The fail-safe lock 600 may be disposed adjacent the motor 104 and be configured to restrict the main ball screw 202 from rotating when power is not supplied to the motor 104.

Figure 16:
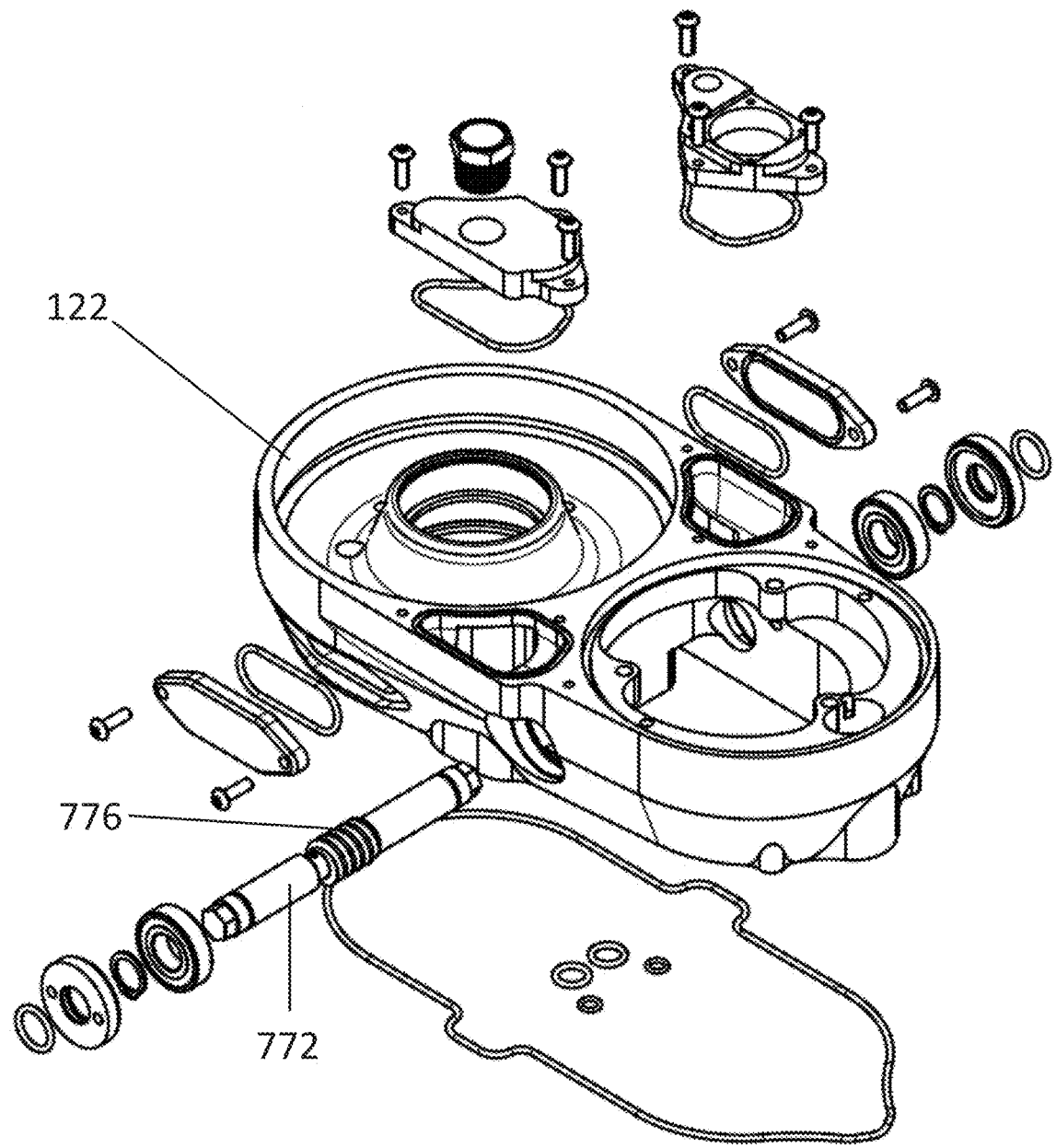
FIG. 16 illustrates an exploded perspective view of the base of the security gate actuator from FIG. 12A.
Figure 17A:
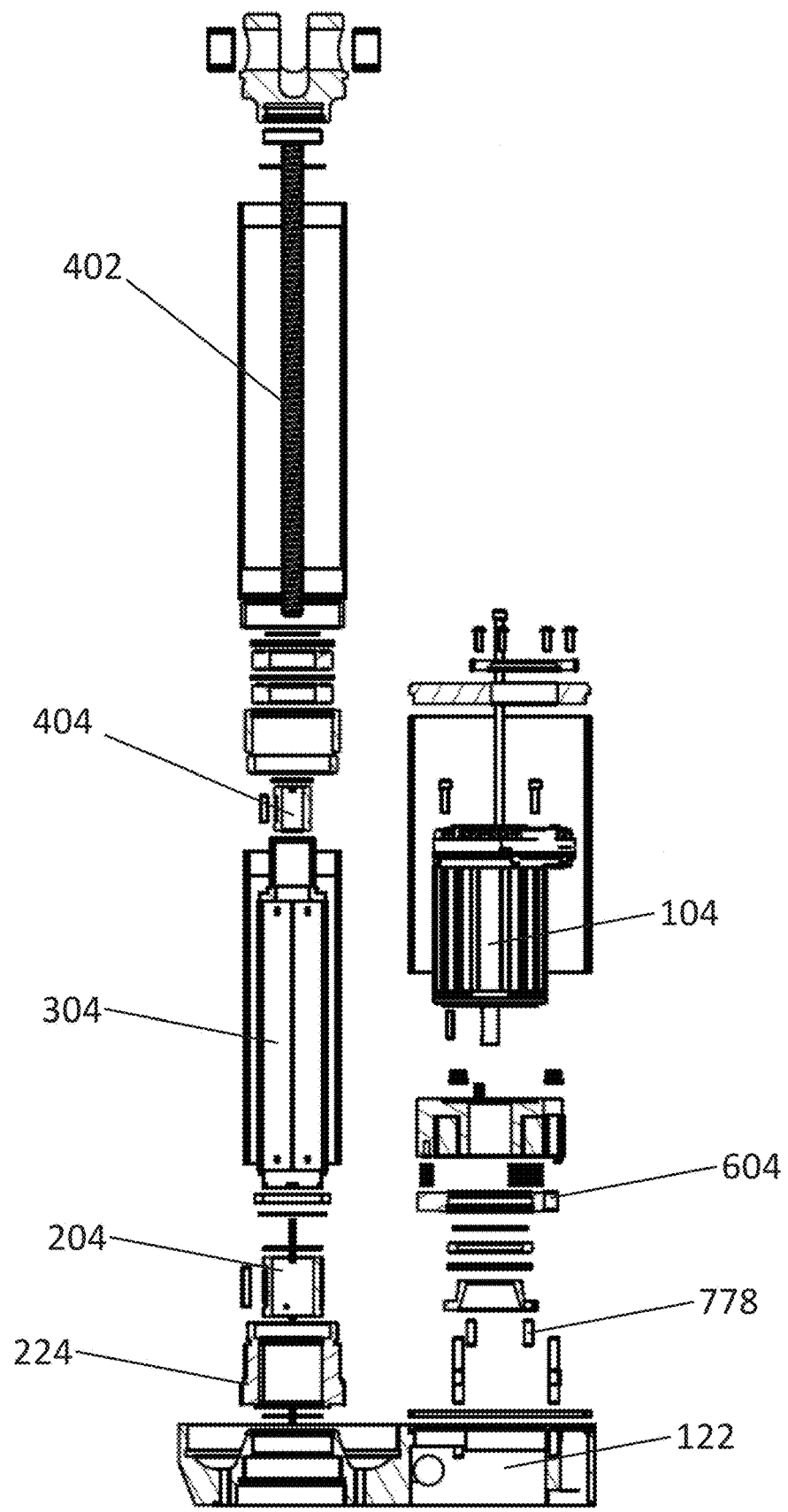
FIG. 17A illustrates a first half of an exploded view of the security gate actuator from FIG. 12A.
Figure 17B:
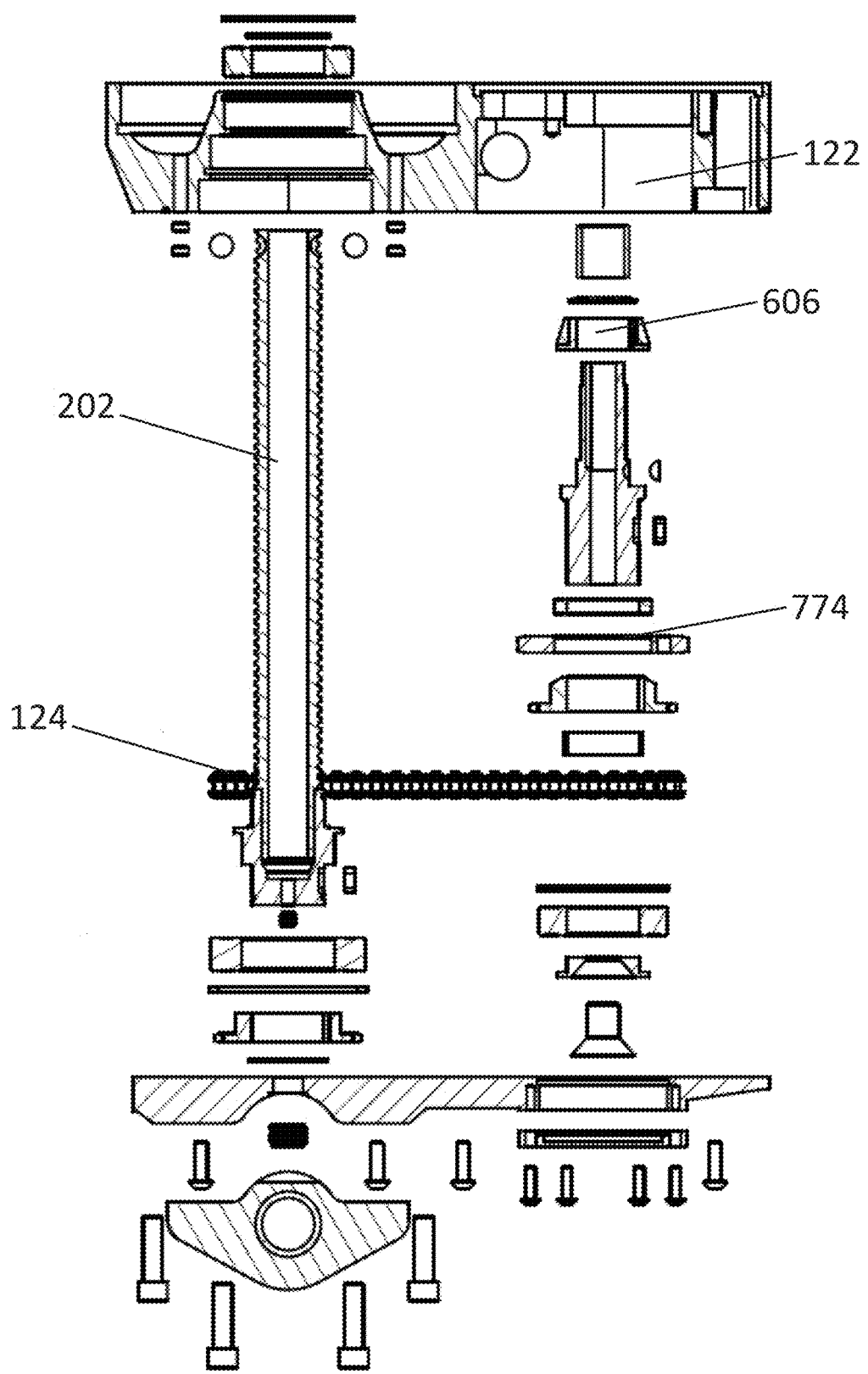
FIG. 17B illustrates a second half of an exploded view of the security gate actuator from FIG. 12A.

The security gate actuator 100 may have a manual lock override system 770 disposed within the base 122 and coupled to the fail-safe lock 600. The lock override system 770 may comprise a lock shaft 772 and a worm gear 774. The lock shaft 772 extends from the base 122 and provides a user of the security gate actuator 100 with access to the lock override system 770. The lock shaft 772 may have a worm 776 that engages with the worm gear 774 such that, when the lock shaft 772 is rotated, the worm gear 774 also rotates. The gear ratio between the worm 776 and the worm gear 774 may be 50:1. The worm gear 774 is rotationally coupled with the lock end 606 of the fail-safe lock 600 through a pin 778, thus allowing the user to rotate the fail-safe lock 600 by rotating the lock shaft 772. FIGS. 16-17 provide exploded views of the security gate actuator 100.

This disclosure, its aspects and implementations, are not limited to the specific components or assembly procedures disclosed herein. Many additional components and assembly procedures known in the art consistent with the intended security gate actuators and methods of operating security gate actuators will become apparent for use with implementations of the apparatus and methods in this disclosure. In places where the description above refers to particular implementations of security gate actuators, it should be readily apparent that a number of modifications may be made without departing from the spirit thereof and that these implementations may be applied to other security gate actuators. The presently disclosed implementations are, therefore, to be considered in all respects as illustrative and not restrictive, the scope of the disclosure being indicated by the appended claims rather than the foregoing description. All changes that come within the meaning and range of equivalency of the description are intended to be embraced therein. Accordingly, for example, although particular security gate actuators and methods of operating security gate actuators are disclosed, such apparatus, methods, and implementing components may comprise any shape, size, style, type, model, version, class, grade, measurement, concentration, material, quantity, or the like as is known in the art for such apparatus, methods, and implementing components, and/or the like consistent with the intended operation of the security gate actuators and methods of operating security gate actuators may be used.

The invention claimed is:

1. A security gate actuator, comprising:
   a motor mounted on a base and configured to electrically couple to a power source;
   a main stage comprising a main ball screw and a main ball nut, the main ball screw having a first end proximate the base and operatively coupled to the motor, a second end opposite the first end, and a central axis, the main ball nut configured to translate rotational motion of the main ball screw to linear motion of the main ball nut;
   a drive shaft stage sharing the central axis and comprising a drive shaft end and a drive shaft tube, the drive shaft tube comprising a first end proximate the base and a second end opposite the first end and distal to the base, the drive shaft end coupled to the main ball nut and coupled to the drive shaft tube at the first end of the drive shaft tube, the drive shaft tube coupled to the main ball screw through a slip joint configured to translate the rotational motion of the main ball screw to rotational motion of the drive shaft tube; and
   a second stage comprising a second ball screw and a second ball nut, the second ball screw sharing the central axis, the second ball nut attached to the drive shaft tube at the second end of the drive shaft tube and configured to translate the rotational motion of the drive shaft tube to linear motion of the second ball screw.

2. The security gate actuator of claim 1, further comprising:
   a fail-safe lock disposed adjacent the motor, the fail-safe lock configured to restrict the main ball screw from rotating when power is not supplied to the motor; and
   a manual lock override system disposed within the base and coupled to the fail-safe lock, wherein the manual lock override system comprises a lock shaft extending from the base and a worm gear operatively engaged with the lock shaft, the manual lock override system configured to allow a user to override the fail-safe lock and provide rotational motion to the main ball screw when power is not supplied to the motor.

3. The security gate actuator of claim 1, wherein:
   the main ball screw further comprises a screw body having an outer diameter and a circular channel disposed on the outer surface of the main ball screw at the second end of the main ball screw;
   the drive shaft end further comprises a core having an inner diameter, the drive shaft tube further comprising a square cuboid having a square base, a side of the square base being greater than the outer diameter of the main ball screw but smaller than the inner diameter of the drive shaft end, the drive shaft tube disposed around and outside the second end of the main ball screw, the drive shaft end disposed around and outside the first end of the drive shaft tube; and
   the slip joint further comprises at least one drive ball, each of the at least one drive ball disposed in the circular channel of the main ball screw adjacent a vertex of the square base of the drive shaft tube and positioned in contact with two joining faces of the drive shaft tube; and
   wherein each of the at least one drive ball pushes against at least one of the joining faces of the drive shaft tube and translates the rotational motion of the main ball screw to the rotational motion of the drive shaft tube when the main ball screw rotates.

4. The security gate actuator of claim 1, wherein the security gate actuator comprises a fully-retracted position and a fully-extended position, wherein in the fully-retracted position a majority of the main ball screw is disposed inside the drive shaft tube and a majority of the second ball screw is disposed inside the drive shaft tube, and in the fully-extended position the first end of the drive shaft tube is disposed adjacent the second end of the main ball screw and a first end of the second ball screw is disposed adjacent the second end of the drive shaft tube.

5. The security gate actuator of claim 1, wherein the main ball screw further comprises a tunnel extending from the second end of the main ball screw into inside of a screw body of the main ball screw, and a portion of the second ball screw is disposed in the tunnel when the security gate actuator is in a fully-retracted position.

6. The security gate actuator of claim 1, further comprising a position sensor located inside the security gate actuator and a magnet disposed adjacent the drive shaft stage, wherein the position sensor is magnetically triggered by the magnet as the security gate actuator moves from a fully-retracted position to a fully-extended position.

7. A security gate actuator, comprising:
   a motor mounted on a base and configured to electrically couple to a power source;
   a main stage comprising a main ball screw and a main ball nut, the main ball screw having a first end proximate the base and operatively coupled to the motor and a second end opposite the first end, the main ball screw further having an outer surface and a central axis, the main ball nut disposed around and mateably coupled to the outer surface of the main ball screw, the main ball nut configured to translate rotational motion of the main ball screw to linear motion of the main ball nut;
   a drive shaft stage sharing the central axis and comprising a drive shaft end and a drive shaft tube, the drive shaft tube comprising a first end proximate the base and a second end opposite the first end and distal to the base, the drive shaft end coupled to the main ball nut and coupled to the drive shaft tube at the first end of the drive shaft tube, the drive shaft tube coupled to the main ball screw through a slip joint configured to translate the rotational motion of the main ball screw to rotational motion of the drive shaft tube; and
   a second stage comprising a second ball screw and a second ball nut, the second ball screw sharing the central axis and comprising an outer surface, the second ball nut disposed around and mateably coupled to the outer surface of the second ball screw, the second ball nut attached to the drive shaft tube at the second end of the drive shaft tube and configured to translate the rotational motion of the drive shaft tube to linear motion of the second ball screw, the second ball screw configured to couple to a wedge plate barrier of a security gate.

8. The security gate actuator of claim 7, further comprising a fail-safe lock disposed adjacent the motor, the fail-safe lock configured to restrict the main ball screw from rotating when power is not supplied to the motor.

9. The security gate actuator of claim 8, further comprising a manual lock override system disposed within the base and coupled to the fail-safe lock, wherein the manual lock override system comprises a lock shaft extending from the base and a worm gear operatively engaged with the lock shaft, the manual lock override system configured to allow a user to override the fail-safe lock and provide rotational motion to the main ball screw when power is not supplied to the motor.

10. The security gate actuator of claim 7, wherein:
the main ball screw further comprises a screw body having an outer diameter and a circular channel disposed on the outer surface of the main ball screw at the second end of the main ball screw;
the drive shaft end further comprises a core having an inner diameter, the drive shaft tube further comprising a square cuboid having a square base, a side of the square base being greater than the outer diameter of the main ball screw but smaller than the inner diameter of the drive shaft end, the drive shaft tube disposed around and outside the second end of the main ball screw, the drive shaft end disposed around and outside the first end of the drive shaft tube; and
the slip joint further comprises at least two drive balls, each of the at least two drive balls disposed in the circular channel of the main ball screw adjacent a vertex of the square base of the drive shaft tube and positioned in contact with two joining faces of the drive shaft tube; and
wherein each of the at least two drive balls pushes against at least one of the joining faces of the drive shaft tube and translates the rotational motion of the main ball screw to the rotational motion of the drive shaft tube when the main ball screw rotates.

11. The security gate actuator of claim 7, wherein the security gate actuator comprises a fully-retracted position and a fully-extended position, wherein in the fully-retracted position a majority of the main ball screw is disposed inside the drive shaft tube and a majority of the second ball screw is disposed inside the drive shaft tube, and in the fully-extended position the first end of the drive shaft tube is disposed adjacent the second end of the main ball screw and a first end of the second ball screw is disposed adjacent the second end of the drive shaft tube.

12. The security gate actuator of claim 7, wherein the main ball screw further comprises a tunnel extending from the second end of the main ball screw into inside of a screw body of the main ball screw, and a portion of the second ball screw is disposed in the tunnel when the security gate actuator is in a fully-retracted position.

13. The security gate actuator of claim 7, further comprising a position sensor located inside the security gate actuator and a magnet disposed adjacent the drive shaft stage, wherein the position sensor is magnetically triggered by the magnet as the security gate actuator moves from a fully-retracted position to a fully-extended position.

14. The security gate actuator of claim 7, further comprising a first position sensor disposed adjacent the first end of the main ball screw, a second position sensor disposed adjacent the second end of the main ball screw, and a third position sensor disposed between the first end and the second end of the main ball screw, wherein each of the first, second, and third position sensors is triggered as the security gate actuator moves from a fully-retracted position to a fully-extended position.

15. A security gate actuator, comprising:
a motor mounted on a base and configured to electrically couple to a power source;
a main stage comprising a main ball screw and a main ball nut, the main ball screw having a first end proximate the base and operatively coupled to the motor and a second end opposite the first end, the main ball screw further having a central axis and comprising main threads disposed on an outer surface of the main ball screw, the main ball nut disposed around and mateably coupled to the main threads, the main ball nut configured to translate rotational motion of the main ball screw to linear motion of the main ball nut;
a drive shaft stage sharing the central axis and comprising a drive shaft end and a drive shaft tube, the drive shaft tube comprising a first end proximate the base and a second end opposite the first end and distal to the base, the drive shaft end coupled to the main ball nut and coupled to the drive shaft tube at the first end of the drive shaft tube, the drive shaft tube coupled to the main ball screw through a slip joint configured to translate the rotational motion of the main ball screw to rotational motion of the drive shaft tube;
a second stage comprising a second ball screw and a second ball nut, the second ball screw sharing the central axis and comprising second threads disposed on an outer surface of the second ball screw, the second ball nut disposed around and mateably coupled to the second threads, the second ball nut attached to the drive shaft tube at the second end of the drive shaft tube and configured to translate the rotational motion of the drive shaft tube to linear motion of the second ball screw, the second ball screw configured to couple to a wedge plate barrier of a security gate;
a fail-safe lock disposed adjacent the motor, the fail-safe lock configured to restrict the main ball screw from rotating when power is not supplied to the motor;
a manual lock override system disposed within the base and coupled to the fail-safe lock, wherein the manual lock override system comprises a lock shaft extending from the base and a worm gear operatively engaged with the lock shaft, the manual lock override system configured to allow a user to override the fail-safe lock and provide rotational motion to the main ball screw when power is not supplied to the motor; and
an air manifold coupled to the base and configured to receive air into the security gate actuator and maintain positive air pressure inside the security gate actuator relative to outside of the security gate actuator.

16. The security gate actuator of claim 15, wherein:
the main ball screw further comprises a screw body having an outer diameter and a circular channel disposed on the outer surface of the main ball screw at the second end of the main ball screw;
the drive shaft end further comprises a core having an inner diameter, the drive shaft tube further comprising a square cuboid having a square base, a side of the square base being greater than the outer diameter of the main ball screw but smaller than the inner diameter of the drive shaft end, the drive shaft tube disposed around and outside the second end of the main ball screw, the drive shaft end disposed around and outside the first end of the drive shaft tube; and
the slip joint further comprises at least three drive balls, each of the at least three drive balls disposed in the circular channel of the main ball screw adjacent a vertex of the square base of the drive shaft tube and positioned in contact with two joining faces of the drive shaft tube; and wherein each of the at least three drive balls pushes against at least one of the joining faces of the drive shaft tube and translates the rotational motion of the main ball screw to the rotational motion of the drive shaft tube when the main ball screw rotates.

17. The security gate actuator of claim 15, wherein the security gate actuator comprises a fully-retracted position and a fully-extended position, wherein in the fully-retracted position a majority of the main ball screw is disposed inside the drive shaft tube and a majority of the second ball screw is disposed inside the drive shaft tube, and in the fully-extended position the first end of the drive shaft tube is disposed adjacent the second end of the main ball screw and a first end of the second ball screw is disposed adjacent the second end of the drive shaft tube.

18. The security gate actuator of claim 15, wherein the main ball screw further comprises a tunnel inside the main ball screw, the tunnel extending from the second end of the main ball screw into a screw body of the main ball screw, and a portion of the second ball screw is disposed in the tunnel when the security gate actuator is in a fully-retracted position.

19. The security gate actuator of claim 15, further comprising a position sensor located inside the security gate actuator and a magnet disposed adjacent the drive shaft stage, wherein the position sensor is magnetically triggered by the magnet as the security gate actuator moves from a fully-retracted position to a fully-extended position.

20. The security gate actuator of claim 15, further comprising a power-assist spring surrounding the main stage, the drive shaft stage, and the second stage, the power-assist spring comprising a first end proximate the base and a second end proximate an end of the second ball screw.

\* \* \* \* \*